United States Patent [19]

Kon et al.

[11] 4,114,252
[45] Sep. 19, 1978

[54] MANUFACTURING APPARATUS FOR TAPE CASSETTE

[75] Inventors: Tsuneyoshi Kon, Kawasaki; Hiroshi Toi, Yokohama; Tamiaki Matsuura; Kiyohiko Akanuma, both of Tokyo; Toru Takamiya, Yokohama; Motosuke Usui, Matsudo, all of Japan

[73] Assignee: Sony Corporation, Tokyo, Japan

[21] Appl. No.: 800,921

[22] Filed: May 26, 1977

[30] Foreign Application Priority Data

May 28, 1976 [JP] Japan .................................. 51-62700

[51] Int. Cl.$^2$ ................. B23Q 7/00; B23P 23/00; B65H 19/20
[52] U.S. Cl. ...................................... 29/563; 29/564.6; 29/705; 29/707; 29/806; 242/56 R
[58] Field of Search ............... 29/564.1, 564.6, 564 R, 29/563, 33 K, 705, 707, 806; 242/56 R

[56] References Cited
U.S. PATENT DOCUMENTS 3,684,203  8/1972  Tollkuhn .................. 242/67.3 R
3,814,343  6/1974  Bennett et al. ............. 242/56 R
4,035,899  7/1977  Matsuda ................... 29/806 X Primary Examiner—Gil Weidenfeld
Attorney, Agent, or Firm—Lewis H. Eslinger; Alvin Sinderbrand

[57] ABSTRACT

A manufacturing apparatus for a tape cassette includes: a rotary table having at least one pair of hub chucks for demountably holding a pair of hubs supplied to the rotary table; a mechanism for clamping an initial end of a supplied tape to one of the hubs held by the hub chucks; a tape winding member for winding a predetermined length of the supplied tape onto the one hub; a cutting member for cutting the trailing side of the wound tape on the one hub; another mechanism for clamping the terminal end of the cut tape to the other of the hubs; and an assembling mechanism for transporting the hubs to which the ends of the tape are clamped and on which the tape is wound, to a position adjacent to a mounted cassette half, demounting the hubs from the hub chucks and assembling the hubs into the mounted cassette half.

7 Claims, 55 Drawing Figures

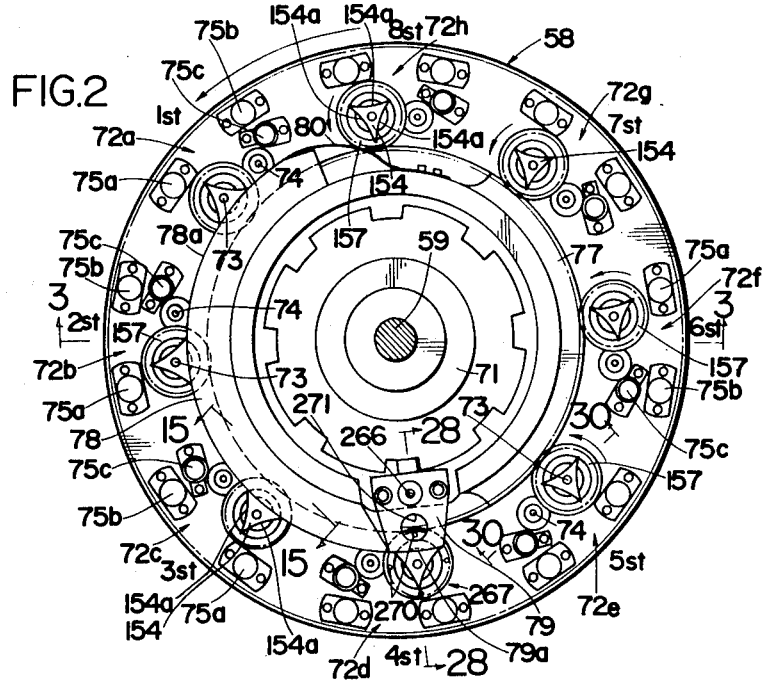

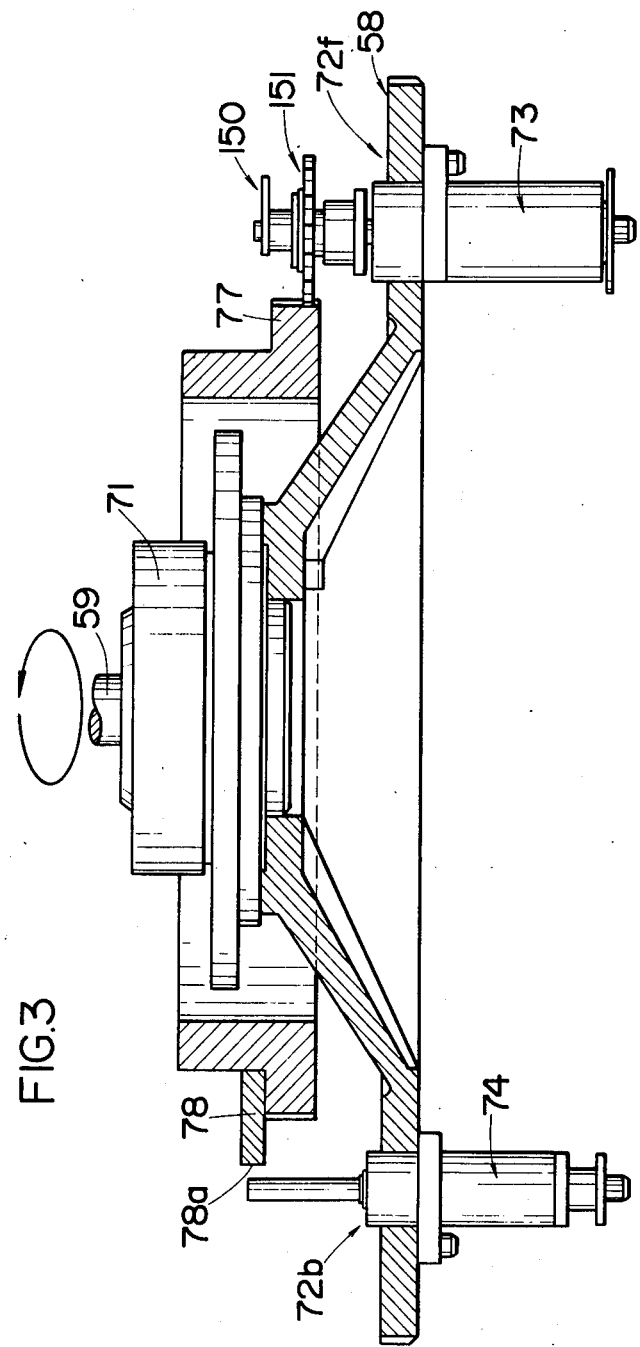

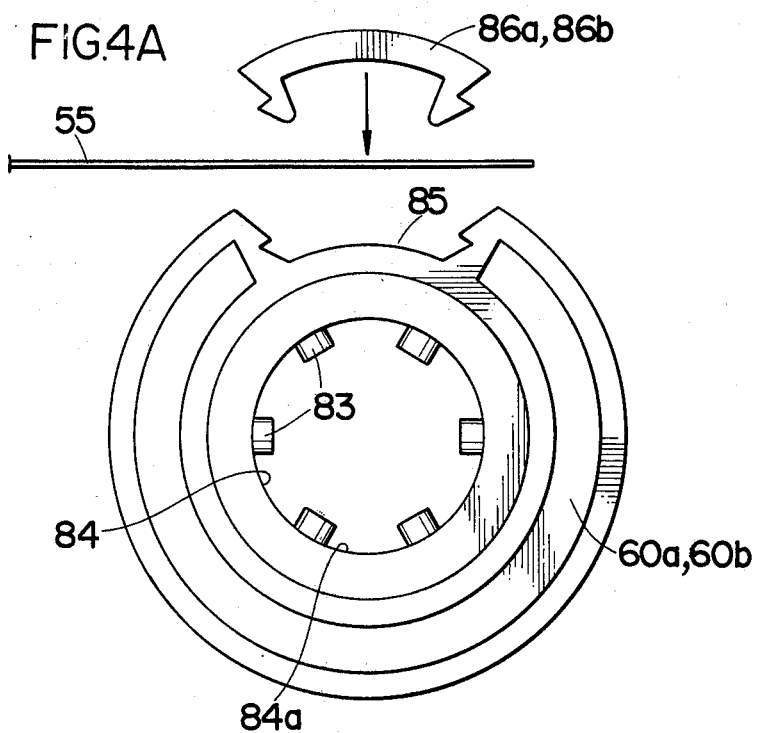
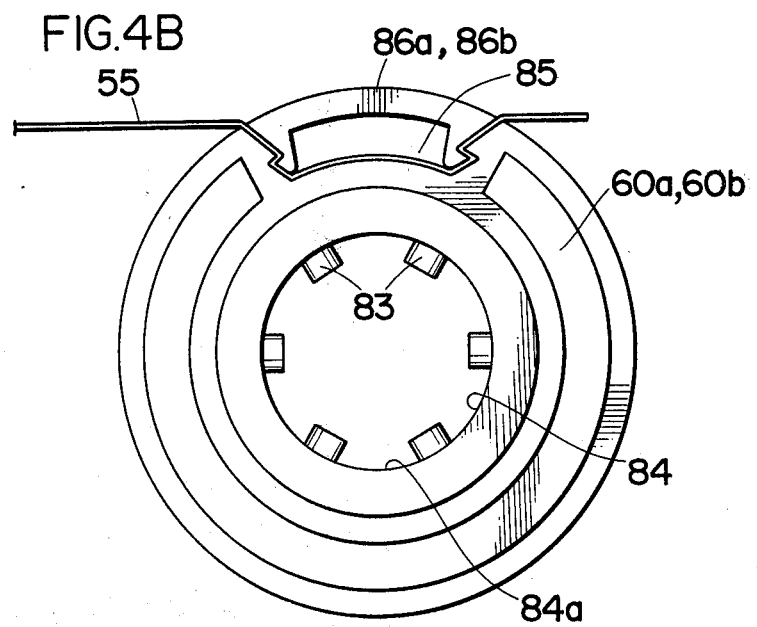

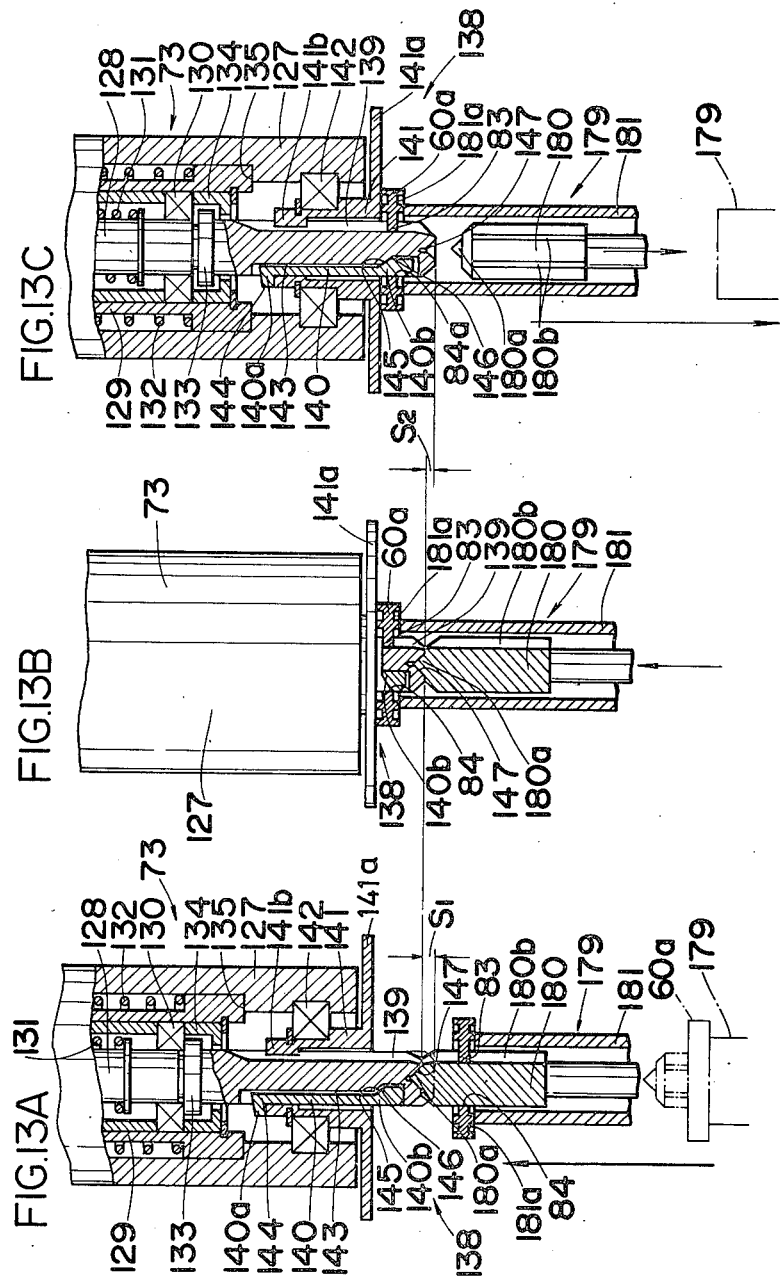

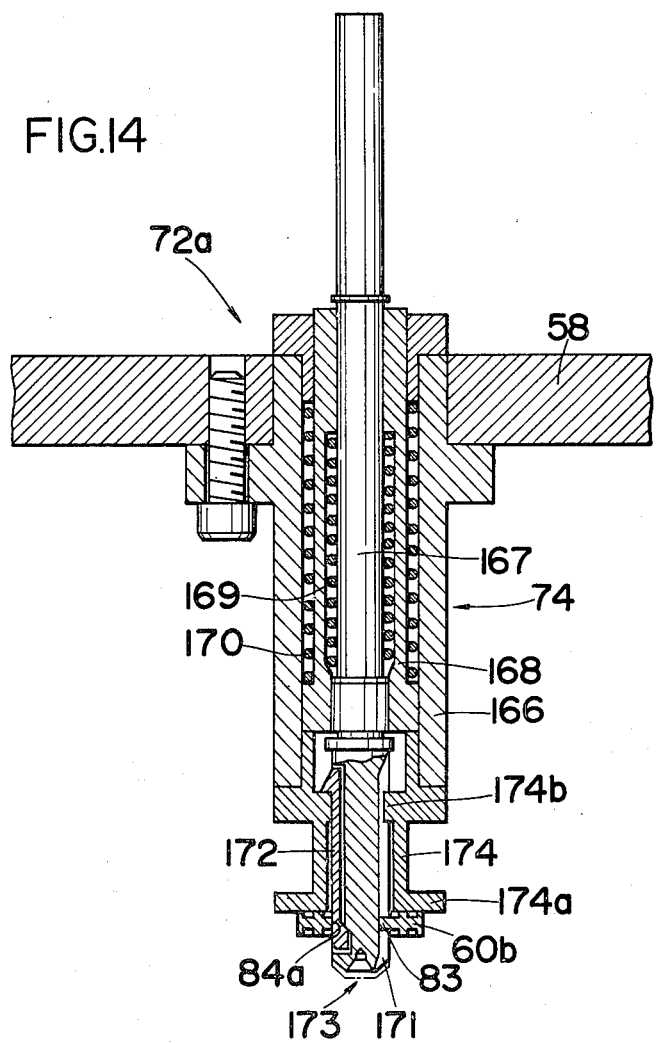

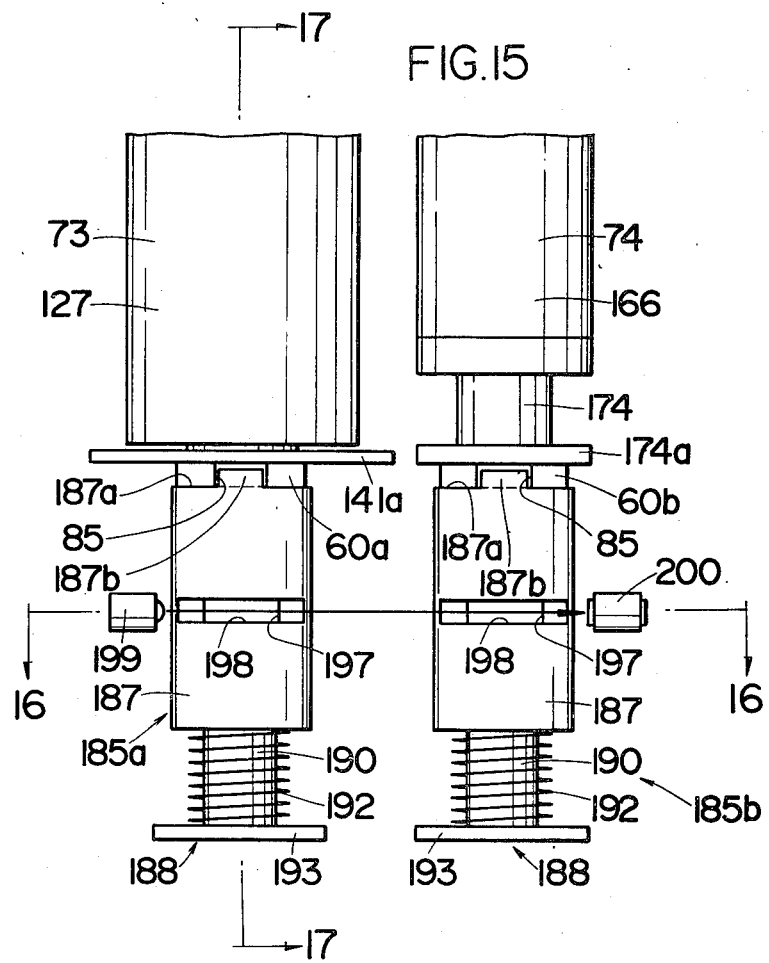

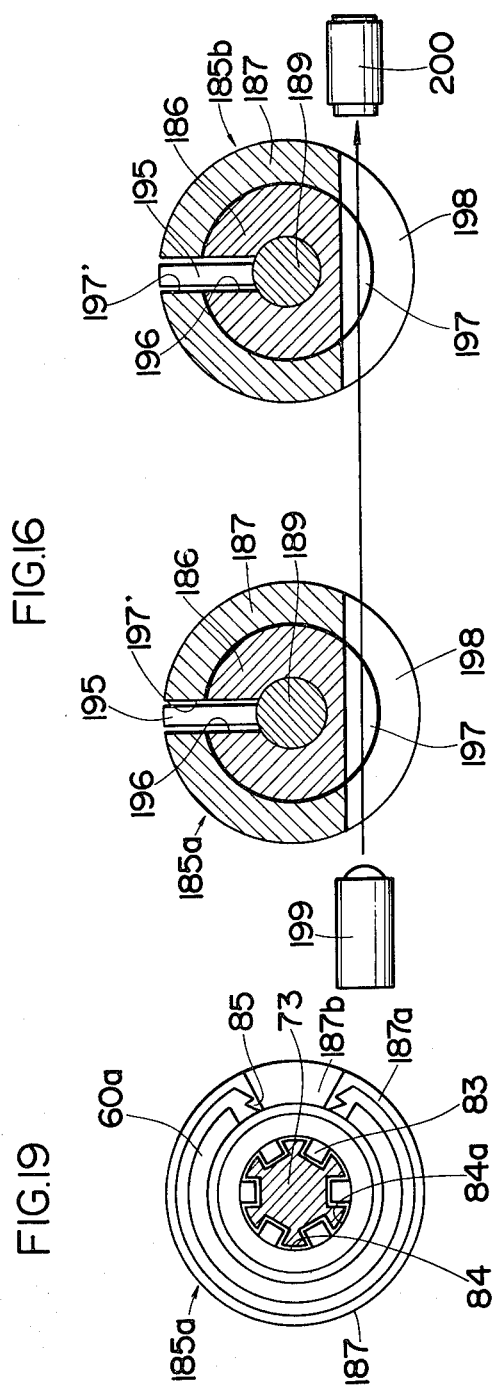

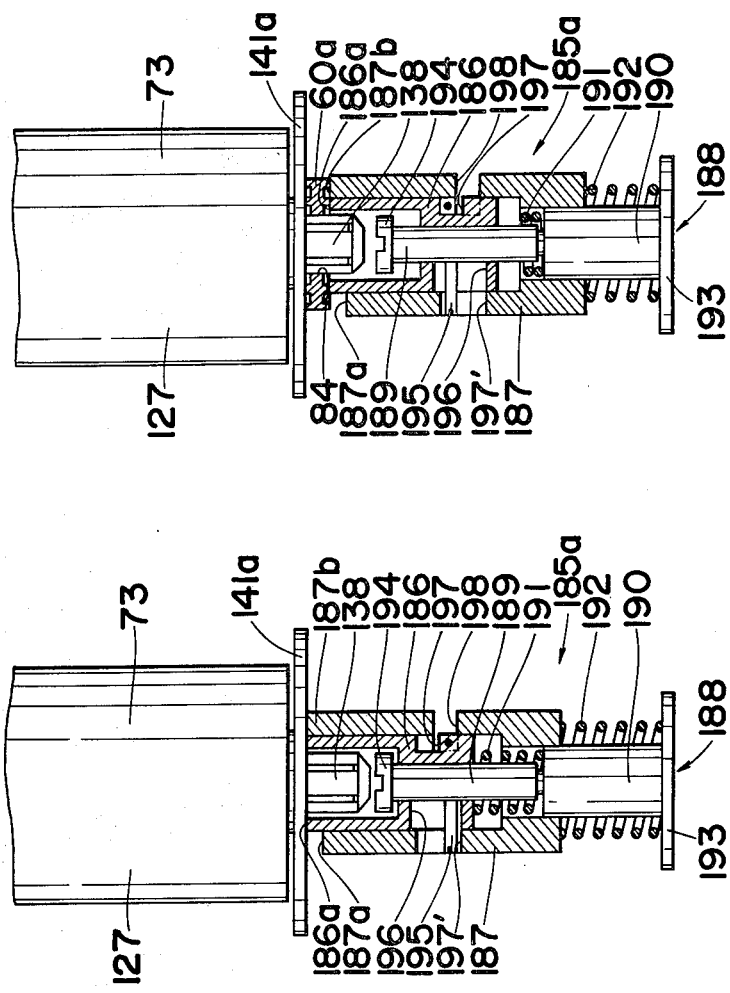

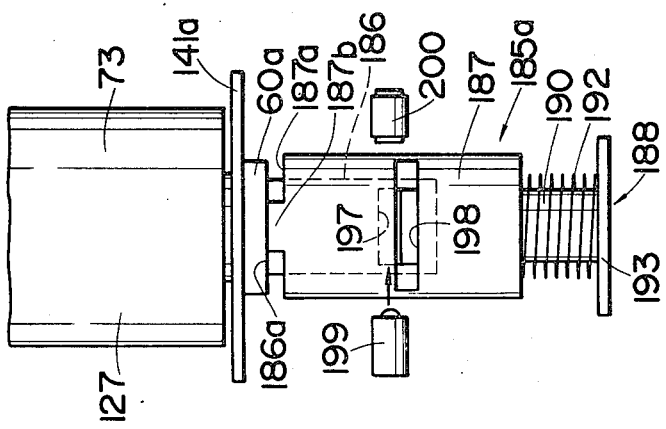
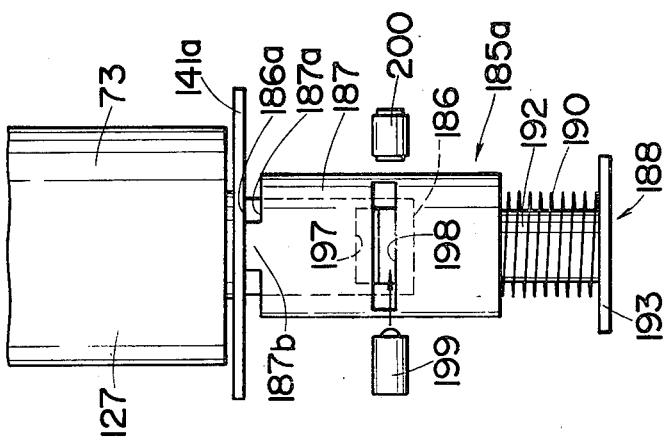
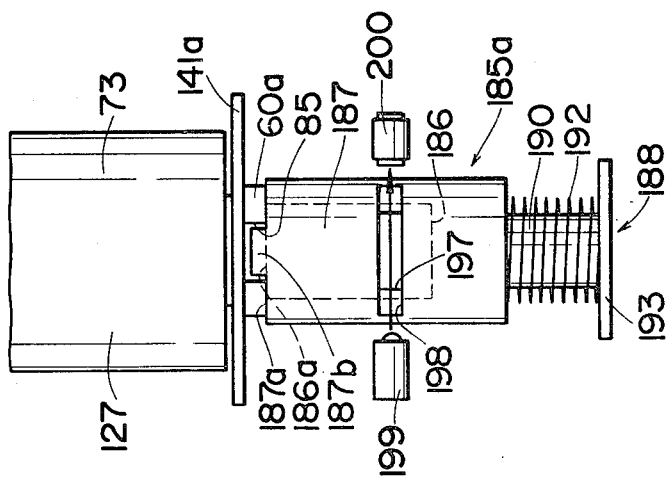

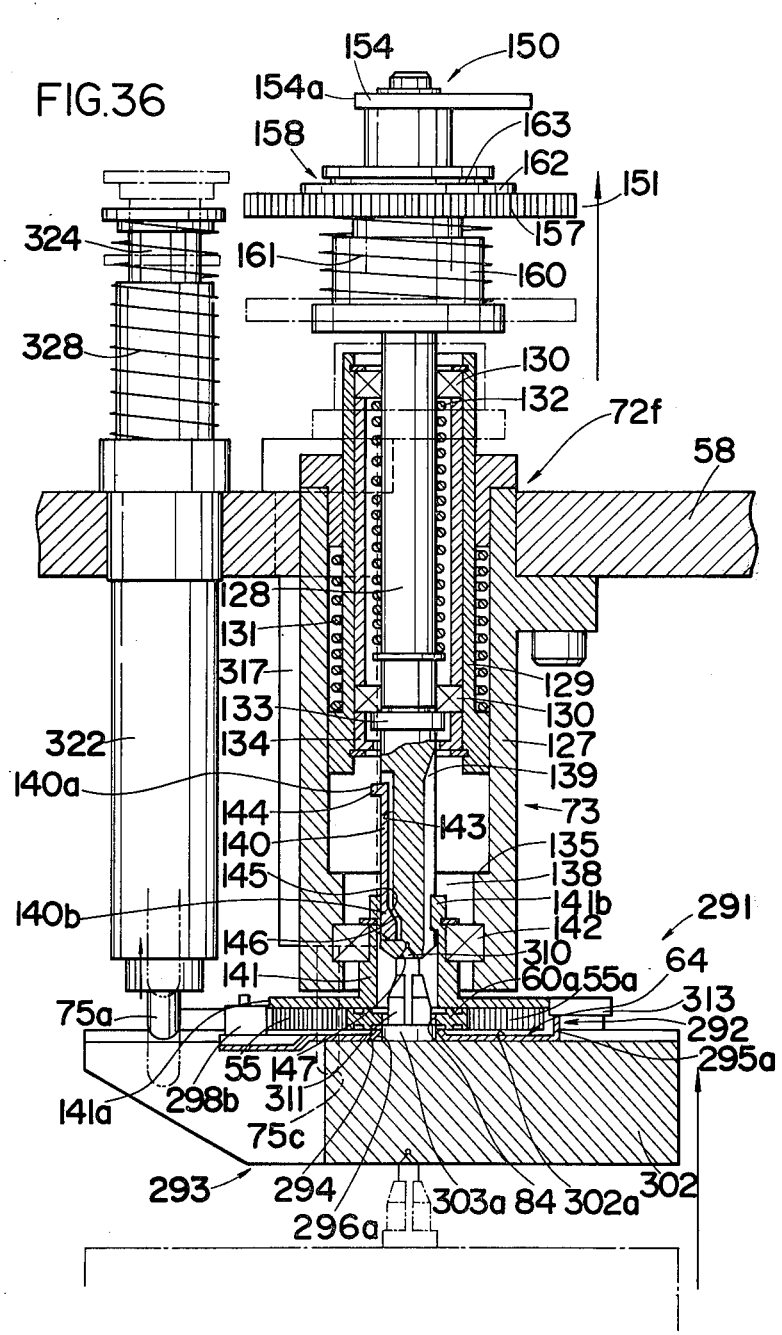

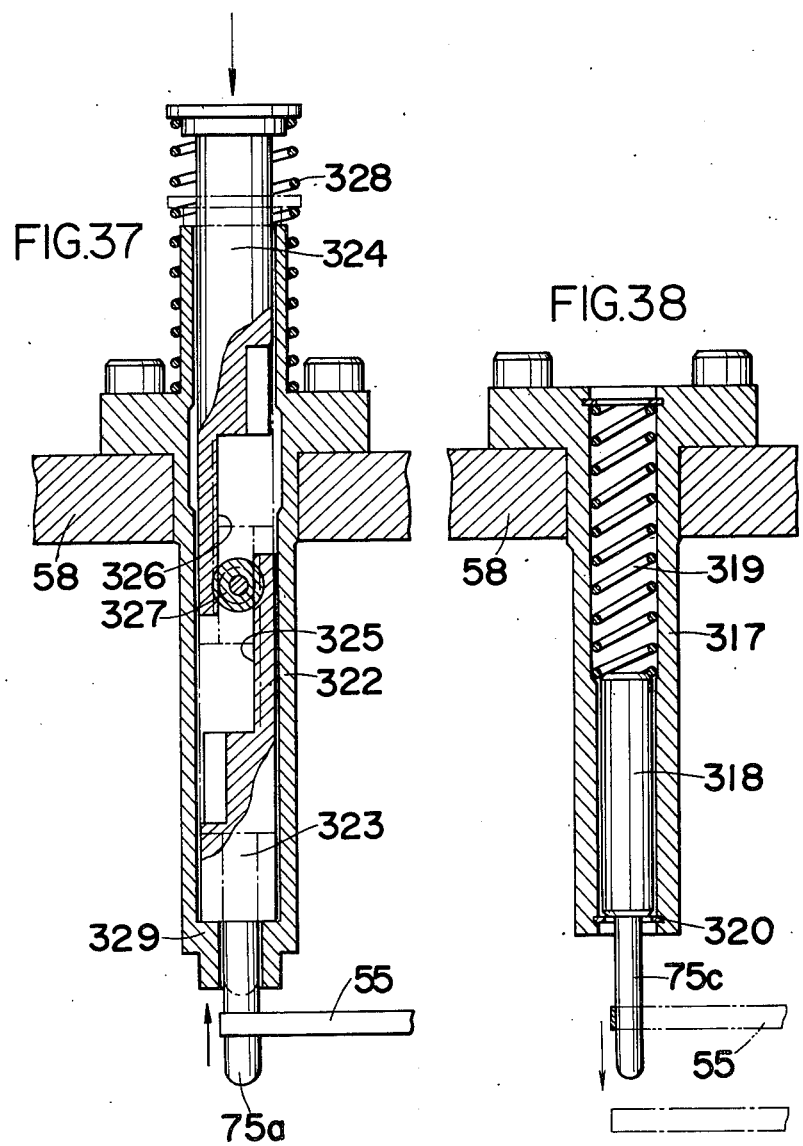

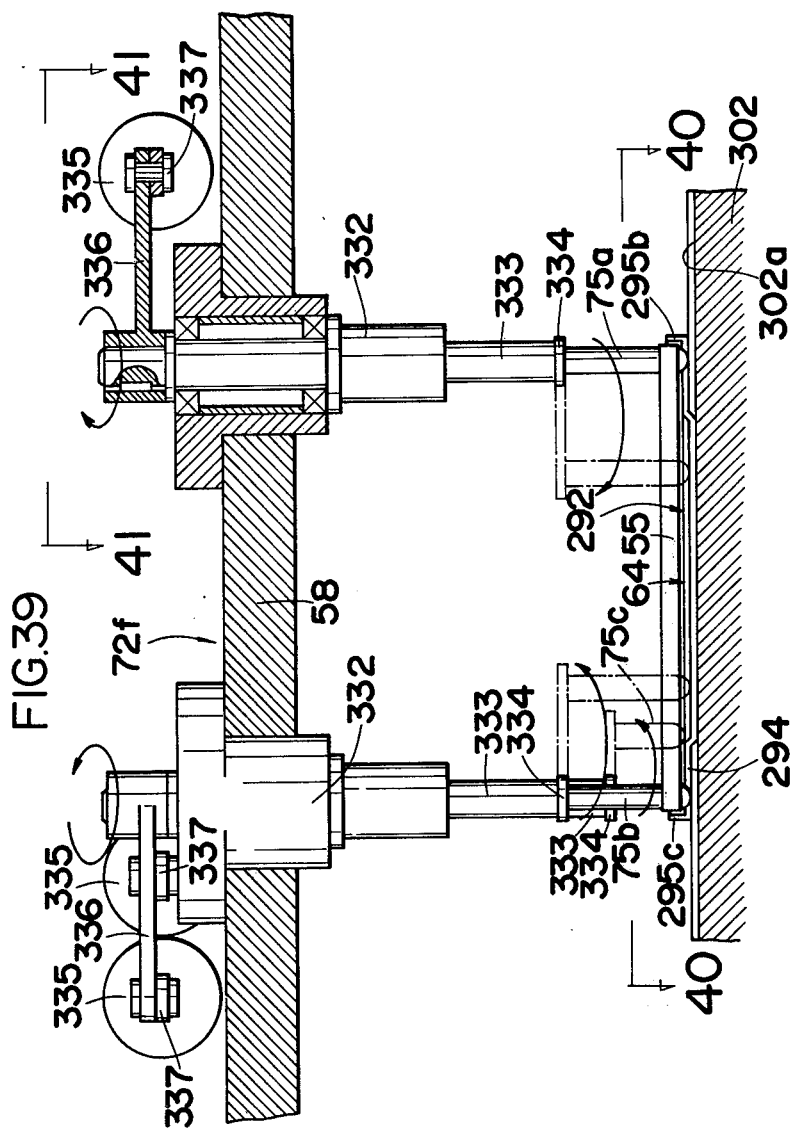

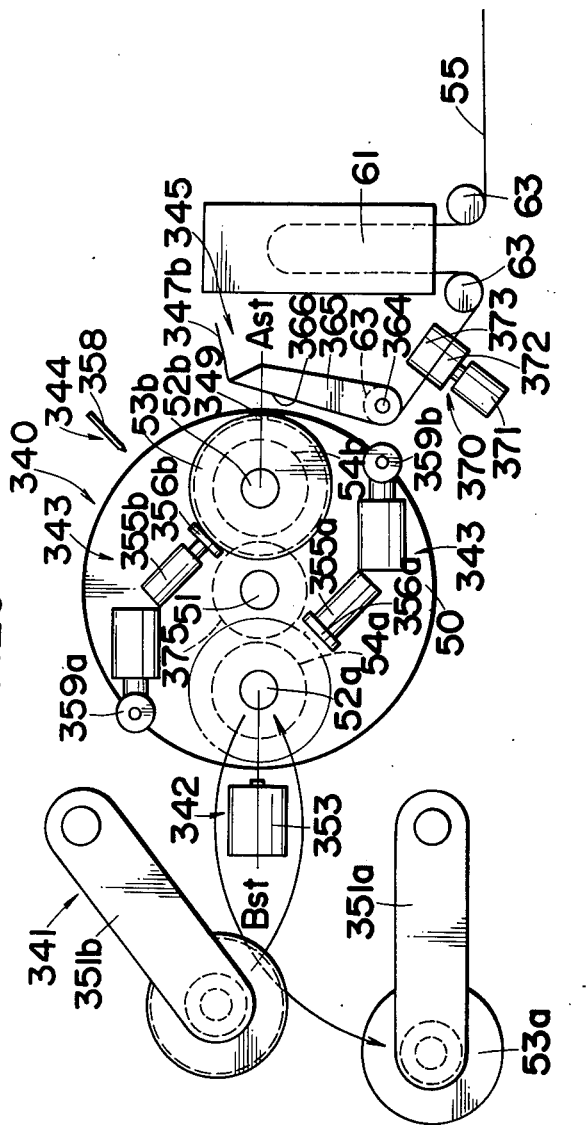

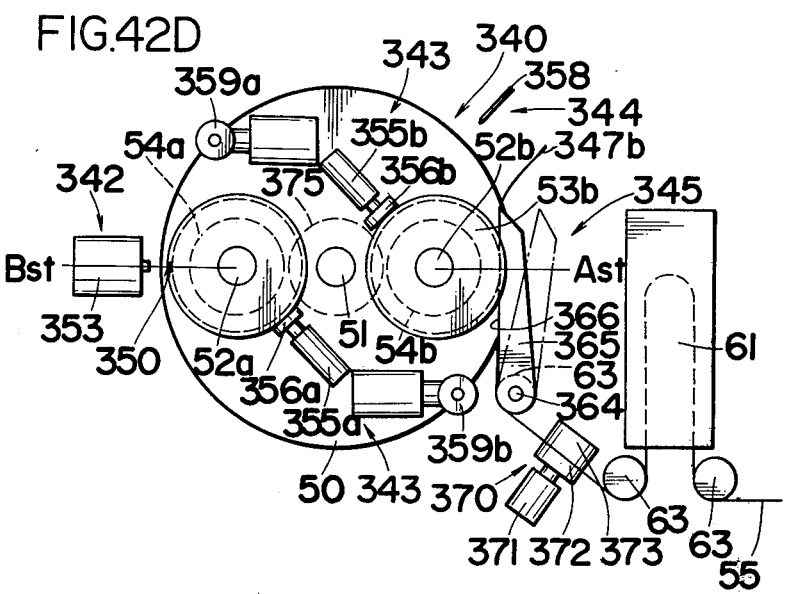
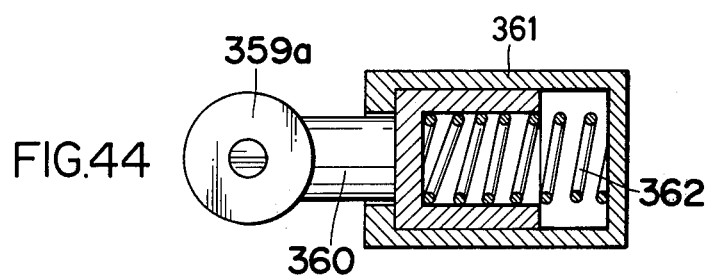
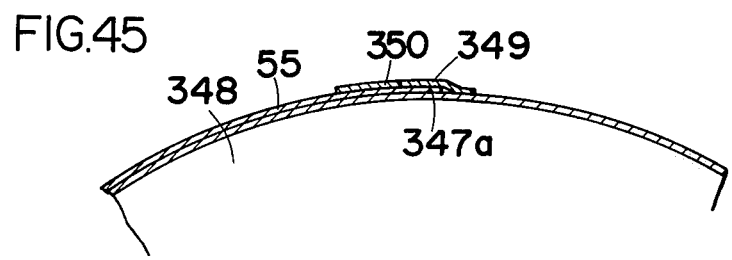

MANUFACTURING APPARATUS FOR TAPE CASSETTE

BACKGROUND OF THE INVENTION

1. Field of the Invention

This invention relates to a manufacturing apparatus for a tape cassette, and more particularly to a manufacturing apparatus for a tape cassette which is suitable for use in a recording and/or reproducing apparatus such as a tape recorder, a VTR, an EVR and a tape player and in which a magnetic tape is clamped to a pair of hubs and wound on the hubs.

2. Description of the Prior Art

A so-called "C-O cassette" is used in the manufacture of a tape cassette for a tape recorder. In the C-O cassette, a pair of hubs are contained in a cassette housing, and a leader tape is fixed at its end to the hubs and wound on the hubs. In the manufacture of the tape cassette, the leader tape is drawn out from the cassette housing, and the central portion of the leader tape is cut. A free end of a magnetic tape is connected to one cut end of the leader tape. Then, a predetermined length of the magnetic tape is rolled onto one of the hubs by rotating the hub to which the leader tape connected to the magnetic type is secured, and the magnetic tape is cut. The end of the cut magnetic tape is connected to the end of the other cut leader tape. The cut magnetic tape and the other cut leader tape are rolled onto the other of the hubs by rotating the latter. Thus, the tape cassette is manufactured. However, the above mentioned manufacturing method has the following disadvantages:

1. Since the magnetic tape is rolled onto the hubs within the cassette housing, the rolling speed of the magnetic tape is limited, and the magnetic tape cannot be rolled onto the hubs at a high speed. Accordingly, the operation efficiency is low.

2. When the magnetic tape is rolled onto the hubs, the edges of the magnetic tape contact with the cassette housing. There is the fear that the magnetic tape is damaged by the cassette housing.

3. Two manufacturing steps, namely one manufacturing step for the C-O cassette and another manufacturing step for assembling the magnetic tape into the C-O cassette are needed for the manufacture of the tape cassette.

In the conventional manufacturing method, the magnetic tape is supplied from a supply tape reel on which a length of a magnetic tape for several tens of tape cassettes is wound. When the whole length of the magnetic tape has been drawn out from the supply tape reel, the used supply tape reel is manually replaced by a fresh supply tape reel, and the fresh supply tape reel is manually set in its operative position. For the manual operation, the manufacturing apparatus has to be temporarily stopped. Accordingly, the productivity is low.

Further, in the conventional manufacturing method, the tape is clamped to the hubs by manual operations using jigs. The tape cut and tape misclamping are detected with naked eyes. Accordingly, the operation efficiency is low. Moreover, the existence of the hubs to be supplied to a predetermined position and the directions of the hubs are detected with the naked eyes.

U.S. Pat. No. 3684203 issued on Aug. 15, 1972 discloses a method of loading cassettes. However, in that method, the tape is clamped to the hubs adjacent to the bottom half of the cassette. Accordingly, the clamping mechanism is complicated, and it is difficult to exactly clamp the tape to the hubs. Moreover, since no tape guide means is provided adjacent to the hubs the tape cannot be exactly wound on the hubs. It is difficult to arrange any tape guide means such as flanges adjacent to the hubs, since the hubs are previously disposed adjacent to the bottom half of the cassette. Further, the bottom half of the cassette is first assembled on a turntable and then the hubs are assembled into the bottom half of the cassette, on the same turntable. Accordingly, the operation efficiency is low.

SUMMARY OF THE INVENTION

Accordingly, it is an object of this invention to provide a tape cassette manufacturing apparatus which overcomes the above disadvantages of the conventional method.

Another object of this invention is to provide a tape cassette manufacturing apparatus which is capable of fully automatic operation.

A further object of this invention is to provide a manufacturing apparatus for a tape cassette in which a magnetic tape can be wound onto a hub at a higher rate, so as to achieve high productivity.

A still further object of this invention is to provide a manufacturing apparatus for a tape cassette in which a magnetic tape can be surely wound onto a hub without damage, so as to achieve high reliability.

A still further object of this invention is to provide a manufacturing apparatus for a tape cassette by which the number of the manufacturing steps can be much reduced.

A still further object of this invention is to provide a manufacturing apparatus for a tape cassette in which a used tape supply reel can be automatically exchanged with a fresh tape supply reel.

A still further object of this invention is to provide a manufacturing apparatus for a tape cassette in which a magnetic tape can be automatically and exactly clamped to hubs.

A still further object of this invention is to provide a manufacturing apparatus for a tape cassette in which a magnetic tape can be accurately wound on rolled onto a hub while being guided by a pair of flanges, so as to provide the roller or wound magnetic tape without any stepped, disorderly or oblique portion.

A still further object of this invention is to provide a manufacturing apparatus for a tape cassette in which the magnetic tape wound on the hubs can be maintained under tension while being transported along a predetermined path.

A still further object of this invention is to provide a manufacturing apparatus for a tape cassette in which the existence and direction of the hubs held by a hub holding means can be simultaneously detected.

A still further object of this invention is to provide a manufacturing apparatus for a tape cassette in which tape-cutting and misclamping can be automatically detected.

In accordance with one aspect of this invention a manufacturing apparatus for a tape cassette comprises:
  a rotary table having at least one pair of hub holding means for demountably holding a pair of hubs supplied to said rotary table;
  means for clamping an initial end of a supplied tape to one of said hubs held by said hub holding means;

a tape winding means for winding a predetermined length of said supplied tape onto said one of the hubs;

a cutting means for cutting a trailing portion of said wound tape on said one of the hubs;

means for clamping the terminal end of said cut tape to the other of the hubs; and an assembling means for transporting said hubs to which the ends of said tape are clamped and on which said tape is wound, to a position adjacent to a mounted cassette half, demounting said hubs from said hub holding means and assembling said hubs into said mounted cassette half. The above, and other objects, features and advantages of this invention, will be apparent from the following description taken in conjunction with the accompanying drawings.

BRIEF DESCRIPTION OF THE DRAWINGS

FIG. 2 is a plan view of a rotary table and associated parts in the apparatus of FIG. 1;

FIG. 3 is an enlarged cross-sectional view taken along the line 3—3 of FIG. 2;

FIG. 4A and FIG. 4B are enlarged plan views to which reference will be made in explaining the manner in which a tape is clamped to a hub in the apparatus of FIG. 1;

FIG. 5 is a plan view of a hub positioning mechanism in the apparatus of FIG. 1;

FIG. 13A to FIG. 13C are enlarged cross-sectional views to which reference will be made in explaining the manner in which the hub is transferred to the rotary hub chuck in the apparatus of FIG. 1;

FIG. 14 is an enlarged cross-sectional view of a stationary hub chuck and associated parts in the apparatus of FIG. 1;

FIG. 15 is an enlarged elevational view of a hub position detection mechanism as viewed along the line 15—15 of FIG. 2;

FIG. 16 is a cross-sectional view taken along the line 16—16 of FIG. 15;

FIG. 17A to FIG. 17C are cross-sectional views, taken along the line 17—17 of FIG. 15, and to which reference will be made in explaining the operation of the hub position detection mechanism of FIG. 15;

FIG. 18A to FIG. 18C are side views respectively corresponding to FIG. 17A to FIG. 17C;

FIG. 19 is an enlarged cross-sectional view taken along the line 19—19 of FIG. 17A;

FIG. 36 is a cross-sectional view taken along the line 36—36 of FIG. 33;

FIG. 37 is a cross-sectional view taken along the line 37—37 of FIG. 33;

FIG. 38 is a cross-sectional view taken along the line 38—38 of FIG. 33;

FIG. 39 is an enlarged cross-sectional view of one modification of a tape guide mechanism;

FIG. 42A to FIG. 42D are plan views of important parts of an automatic tape reel exchange mechanism in the apparatus of FIG. 1;

FIG. 44 is an enlarged cross-sectional view of a tape pushing roller in the mechanism of FIG. 42; and FIG. 45 is an enlarged cross-sectional view of a wound tape on a tape reel in the mechanism of FIG. 42.

DESCRIPTION OF THE PREFERRED EMBODIMENTS

One embodiment of this invention, as applied to an apparatus for manufacturing so-called "compact cassettes" for use in a tape recorder, will be described with reference to the drawings.

Figure 1:
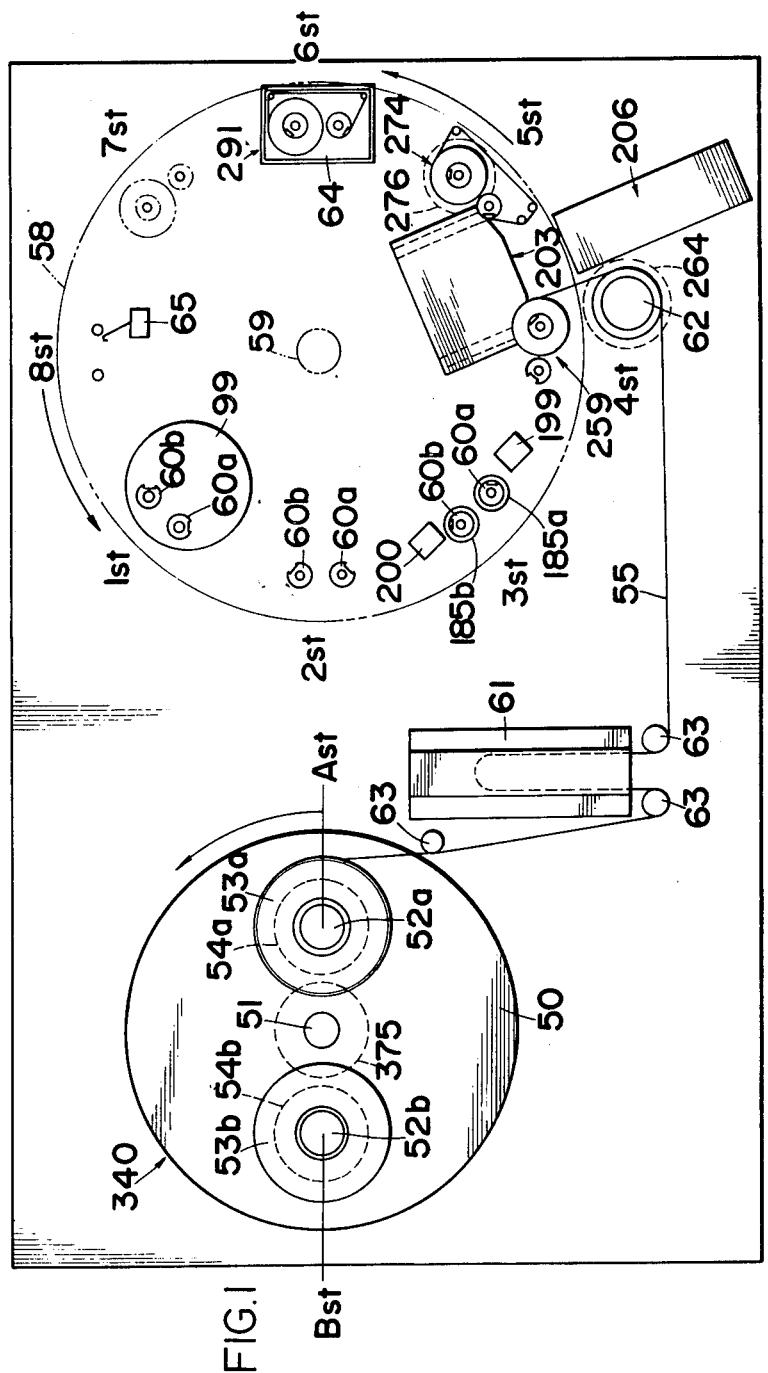
FIG. 1 is a schematic plan view of a tape cassette manufacturing apparatus according to one embodiment of this invention.
Figure 6:
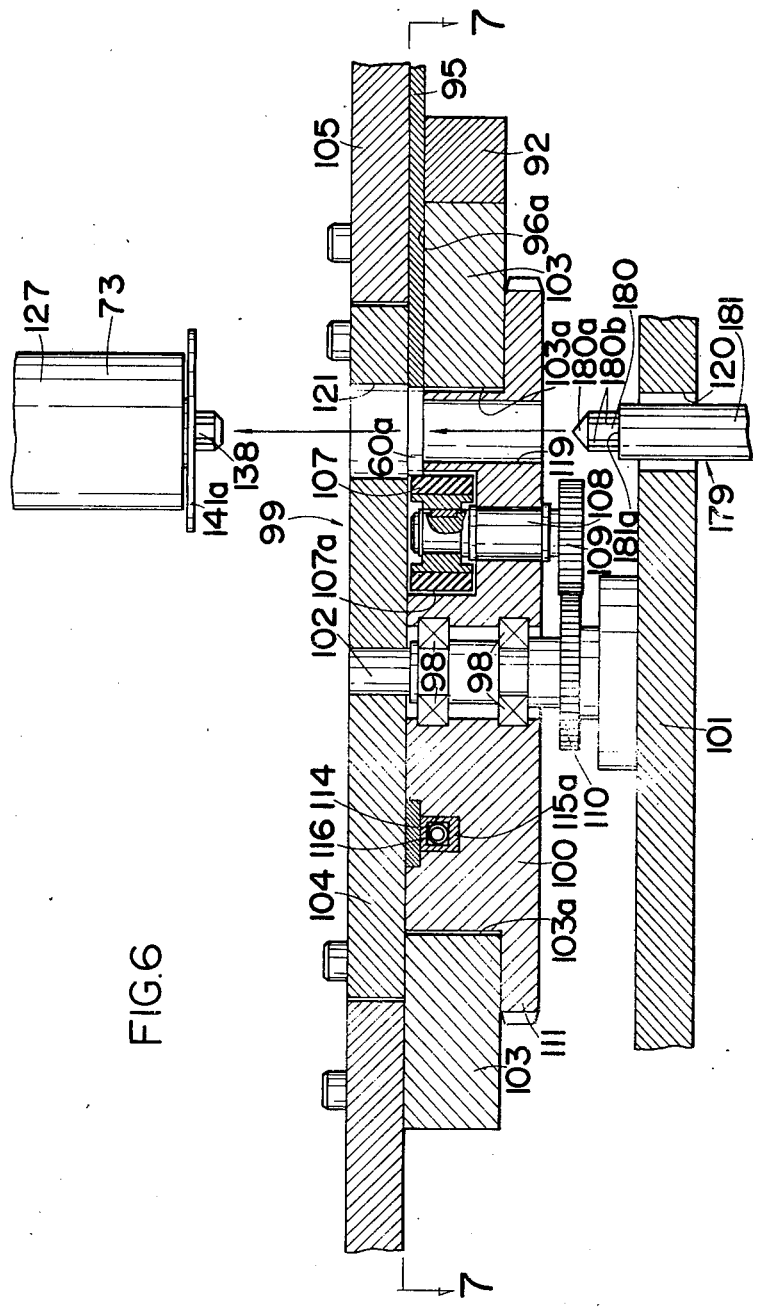
FIG. 6 is an enlarged cross-sectional view taken along the line 6—6 of FIG. 5.

First, an outline of the apparatus will be given with reference to FIG. 1.

A turnable 50 for tape supply reels is so designed as to be rotated intermittently by half a revolution (180°) in the direction shown by the arrow about a rotary shaft 51. Two reel supporting shafts 52a and 52b are rotatably mounted on the turntable 50 at locations diametrically opposed to each other. Tape supply reels 53a and 53b (hereafter simply described "tape reels") are demountably attached to the reel supporting shafts 52a and 52b. The reel supporting shafts 52a and 52b are designed to be rotated by servomotors 54a and 54b attached to the turntable 50 to drive the tape reels 53a and 53b at predetermined high rates, respectively.

An edited magnetic tape 55 (hereafter simply called "tape") is wound on the tape reels 53a and 53b, respectively. The edited magnetic tape 55 consists of, for example, ten pieces of magnetic tape which are connected to each other through leader tapes of predetermined length. Useless tapes are connected to ends of the edited magnetic tape 55, and are, for example, several meters long. The useless tapes are the innermost and outermost of the tapes wound on the tape reels 53a and 53b, and so protect the magnetic tape 55 wound on the tape reels 53a and 53b. A rotary table 58 for assembling is designed to be rotated intermittently in the direction shown by the arrow about a rotary shaft 59. Eight stations, namely the first station 1st to the eighth station 8st are arranged along the peripheral portion of the rotary table 58 at angular intervals of 45°. The rotary table 58 has eight stages and is so designed as to be rotated intermittently by the angle of 45°, namely one eighth revolution in the same direction, so as to dispose the eight stages successively at the eight stations 1st to 8st.

The first station 1st is for hub supply and positioning. The second station 2st is a preparatory station. The third station 3st is for detecting the existence and direction of the hubs. The fourth station 4st is for fixing clamping the initial end of the tape to a hub and winding the tape thereon. The fifth station 5st is for fixing the terminal end of the tape to a hub, and for detecting the tape-cutting and misclamping. The sixth station 6st is for assembling the tape wound on the hubs into a cassette half. The seventh station 7st is for rejecting an article for inferior quality. And the eighth station 8st is for detecting the stage vacancy.

Next, an outline will be given of the manufacturing steps for providing a tape cassette with the above-described apparatus.

A pair of hubs 60a and 60b are supplied onto the stage of rotary table 58 at first station 1st. By cooperation of the rotary table 58 with the associated mechanisms, the hubs 60a and 60b are intermittently transported on the rotary table 58 to the first, second . . . eighth stations for the manufacture of the tape cassette.

First, the supplied hubs 60a and 60b are disposed in predetermined positions at the first station 1st. The positioned hubs 60a and 60b are transported to the third station 3st through the second station 2st. The existence and rotational directions of the hubs 60a and 60b are simultaneously detected at the third station.

Next, the hubs 60a and 60b are transported to the fourth station 4st. At the fourth station 4st, the initial end of the tape 55, which is the free end of the previously cut leader tape, is fixed (clamped) to the one hub 60a, and a predetermined length of the tape 55 is wound on the hub 60a by suitable rotation of the hub 60a and of the reel 53a or 53b carrying the supply of the tape 55.

The winding speed of the tape 55 in the apparatus being described is about 14 meters/sec.. The winding speed of the tape in the conventional manufacturing steps for the C-O type cassette is about 8 meters/sec. Thus, the tape 55 is wound on the hub 60a at about twice the speed used in winding the tape of the C-O type cassette.

The tape 55 is drawn out from the tape reel 53a positioned at a tape supply station Ast, and fed onto the hub 60a along a tape supply path defined by guide rollers 63 and by through a vacuum chamber 61 for detecting tape tension, and a tape feeding roller (so-called "capstan") 62 which also functions as a measuring wheel for measuring the length of the tape.

In the feeding of the tape 55, the tape reel 53a is rotated at the high rate by the servomotor 54a. Accordingly, a load applied to the hub 60a is little.

The length of the tape 55 to be wound on the hub 60a is measured with a measuring mechanism (not shown) attached to the feeding roller 62. At the instant when the predetermined length of the tape 55 is wound on the hub 60a, the rotations of the hub 60a and of the tape reel 53a are stopped.

Then the hubs 60a and 60b are transported to the fifth station 5st. And, during such transport, the tape 55 is cut at the central portion of the leader tape at a location between the fourth station 4st and the fifth station 5st.

At the fifth station 5st, the terminal end of the tape 55 (free end of the cut leader tape) is fixed (clamped) to the other hub 60b. The hub 60a is rotated through a suitable number of revolutions to take up the tape 55 and tension the slackened portion of the tape 55. At that time, the cutting of the tape and the misclamping thereof are detected.

The tape wound on the hubs 60a and 60b is tranported to the sixth station 6st, and assembled into a cassette half 64. Thus, a series of the manufacturing steps is completed.

When the tape wound on the hubs 60a and 60b is judged to be defective at the fifth station, for example, when the tape wound on the hubs 60a and 60b is cut, or misclamped, it is rejected at the seventh station 7st.

Finally a sensor 65 such as a microswitch at the eighth station 8st whether the stage of the rotary table 58 corresponding to the eighth station detects is vacant or not.

The above manufacturing steps are repeated to manufacture several tens of tape cassettes. When the whole of the tape is drawn out from the tape reel 53a, the turntable 50 is rotated by 180°. The old tape reel 53a is transported to a reel exchange station Bst, while a new tape reel 53b is transported to the tape supply station Ast, and the terminal end of the old tape 55 is connected to the initial end of the new tape 55. The useless tape portion is cut away. And the above described manufacturing steps are again repeated.

Next, details of each part of the apparatus will be described. First, details of the rotary table 58 will be described with reference to FIG. 2 and FIG. 3.

The rotary table 58 is suspended from a torque mechanism 71 attached to the lower end of the rotary shaft 59 which is suitably supported by an overhead mechanism (not shown) and rotated intermittently through the angle of 45° by means of an electric motor (not shown). Eight stages 72a to 72h are disposed on the peripheral portions of the rotary table 58, so as to selectively face the previously mentioned eight stations. A rotary hub chuck 73 and a stationary hub chuck 74 are vertically mounted on each of the stages 72a to 72h, and spaced from each other by a contact distance. The pair of hubs 60a and 60b are demountably held by the hub chucks 73 and 74 at the lower ends of the latter. Three tape guides 75a, 75b and 75c are vertically arranged adjacent to the hub chucks 73 and 74 on each of the stages 72a to 72b. Accordingly, there are eight hub-chucks 73 and eight hub-chucks 74 on the rotary table 58, so that the total of the hub chucks 73 and 74 amounts to sixteen. A stationary gear 77 is arranged above the rotary table 58 concentrically with the latter. A stationary cam 78 for positioning the rotary hub chuck 73 is fixed on the stationary gear 77 and extends from the first station 1st to the fourth station 4st. A movable cam 79 (FIG. 2) is arranged adjacent to one end of the stationary cam 78 at the fourth station 4st. A leaf spring guide 80 is fixed to the other end of the stationary cam 78.

With the intermittent rotation of the rotary table 58, the sixteen hub chucks 73 and 74 move past the stations in succession. The hubs 60a and 60b are gripped by the hub chucks 73 and 74 at the lower ends of the latter at the first station 1st and remain so-gripped until the hubs 60a and 60b reach the sixth station 6st. If the tape wound on the hubs 60a and 60b is defective, the hubs 60a and 60b are released by the hub chucks 73 and 74 when they reach the seventh station 7st. The rotary hub chuck 73 is positioned by the stationary cam 78 and movable cam 79, from the first station 1st at until it reaches the fourth station 4st at which the clamping of the terminal end of the tape is finished. The stationary hub chuck 74 is previously positioned.

FIG. 4A and 4B show the construction of the hubs 60a and 60b. As is well known, six detents 83 are fixed on within a central hole 84 of the hub 60a or 60b. A cut-out portion 85 for receiving a clamp piece is formed on the circumference of the hub 60a or 60b. A clamp piece 86a or 86b to be described hereafter is engaged with the cut-out portion 85 of the hub 60a or 60b, together with the end of the tape 55. Thus, the end of the tape 55 is fixed (clamped) to the hub 60a or 60b.

Next, mechanism for supplying and positioning the pair of hubs 60a and 60b at the first station 1st will be described with reference to FIG. 5 to FIG. 8.

FIG. 5 shows a hub supply mechanism 88. The hubs 60a and 60b are fed to air chutes 89a and 89b by vibratory or rotary feeders (both not shown), respectively. The hubs 60a and 60b are transported on the air chutes 89a and 89b in contact with each other, respectively. The pair of hubs 60a and 60b are separately supplied to a hub separator 92 reciprocated by an air cylinder 91, at the tops 90 of the air chutes 89a and 89b, and then transfered to the respective hub supply positions 93 by the hub separator 92. The hubs 60a and 60b are fed into a hub positioning mechanism 99 through hub paths 96a and 96b from the hub supply positions 93 by hub pushers 95 reciprocated by an air cylinder 94. The hubs 60a and 60b are detected at the top 90 of the air chutes 89a and 89b or at the hub supply positions 93 by a photosensor (not shown) to be surely supplied to a predetermined position of the hub positioning mechanism 99.

Figure 7:
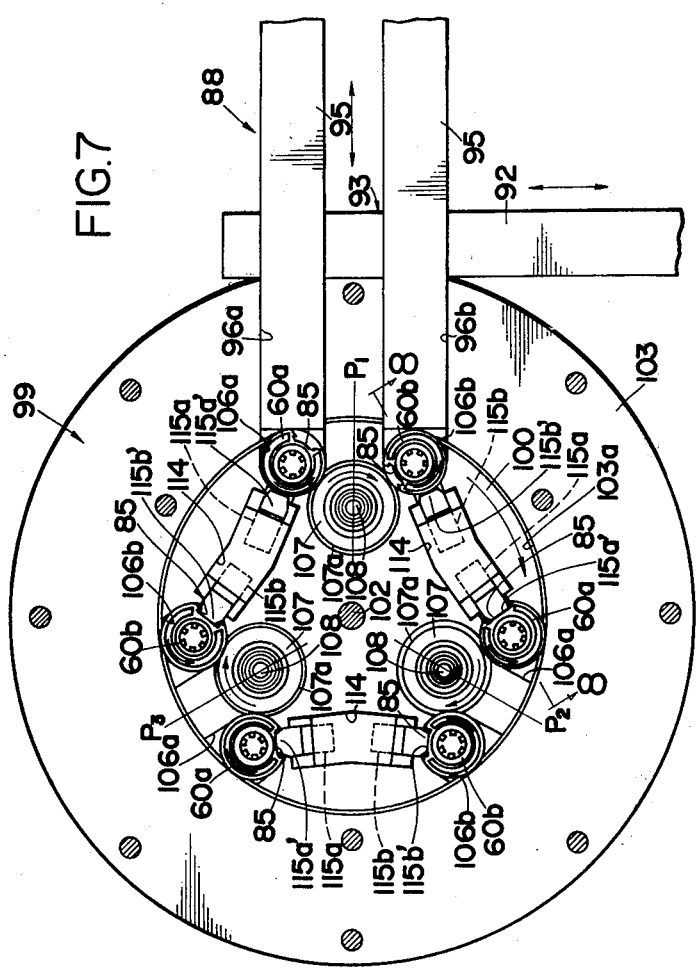
FIG. 7 is a reduced cross-sectional view taken along the line 7—7 of FIG. 6.
Figure 8:
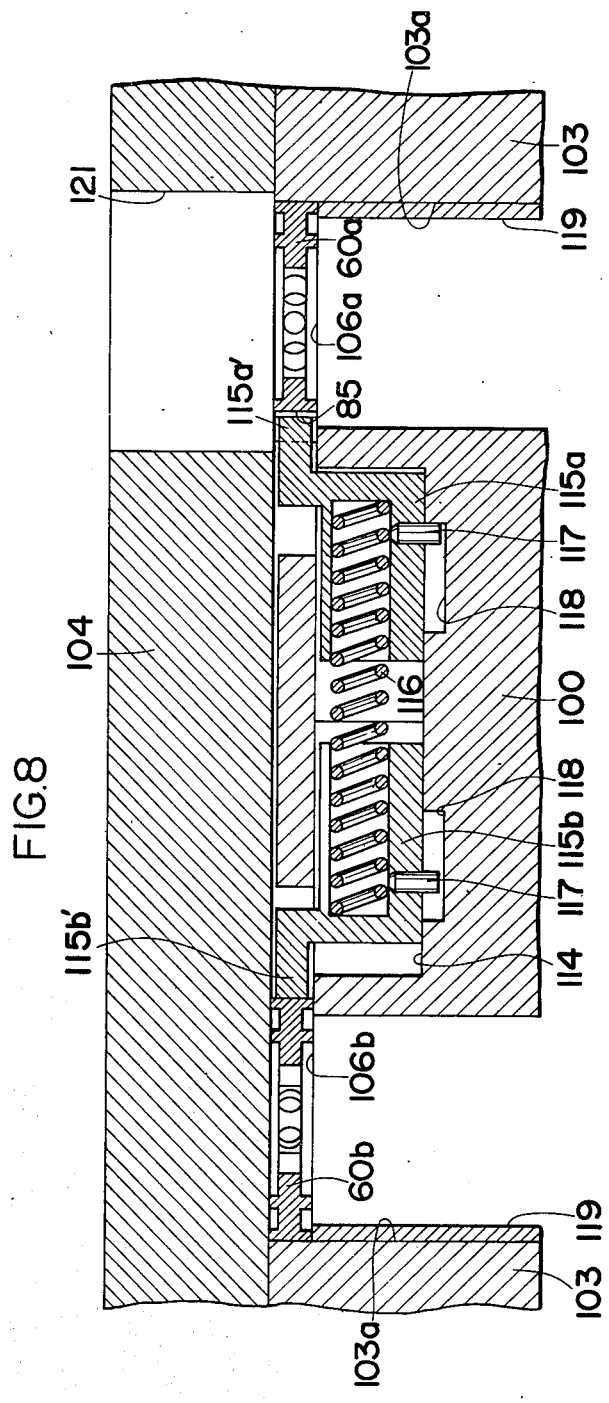
FIG. 8 is an enlarged cross-sectional view taken along the line 8—8 of FIG. 7.

In the hub positioning mechanism 99, a hub positioning drum 100 is rotatably supported through bearings 98 by a supporting shaft 102 fixed on a stationary drum base 101. A stationary annular wall 103 and a stationary disc 104 are arranged around and above the hub positioning drum 100, and fixed to a frame member 105. As shown in FIG. 7, three positions $P_1$, $P_2$ and $P_3$ are defined at regular angular intervals along the periphery of the drum 100. Three pairs of hub receivers 106a and 106b are respectively provided at the three positions P, $P_2$ and $P_3$ in the drum 100. The distance between the hub receivers 106a and 106b is substantially equal to the distance between the hub paths 96a and 96b. The hub receivers 106a and 106b are flush with the hub paths 96a and 96b, substantially semicircular and open at the circumference of the drum 100. When at the position $P_1$, the hub receivers 106a and 106b are aligned with the hub paths 96a and 96b, respectively. Three frictional rollers 107, such as rubber rollers, are rotatably supported on the drum 100 between the hub receivers 106a and 106b, so as to be flush with the latter. A part of the circumferential surface of each frictional roller 107 extends into the respective hub receivers 106a and 106b. The frictional rollers 107 are fixed to the upper ends of rotary shafts 108 passing vertically through the drum 100. Planet gears 109 are fixed to the lower ends of the rotary shafts 108, and engaged with a stationary gear 110 fixed to the lower end of the supporting shaft 102. A larger gear 111 is formed on the lower circumferential surface of the drum 100, and engaged with an intermediate gear 112 which is engaged with a drive gear 113. The drive gear 113 is rotated with an electric motor (not shown) so as to intermittently rotate the drum 100 through an angle of 120°, that is, one third revolution in the direction shown by the arrow on FIG. 7. Three slightly bent cavities 114 for containing hub positioning tongues are provided between the adjacent positions $P_1$, $P_2$ and $P_3$ in the drum 100. A pair of hub positioning tongues 115a and 115b (FIG. 8) are slidably arranged in each of the cavities 114. The hub positioning tongues 115a and 115b are urged in the opposite directions by a compression spring 116 extended therebetween. End portions 115a' and 115b' of the hub positioning tongues are designed to project into the hub receivers 106a and 106b, and in fit closely to the cut-out portions 85 of the hubs 60a and 60b to position the latter. Stopper-guide pins 117 are fixed to lower portions of the hub positioning tongues 115 and 115b, and inserted into oblong grooves 118 formed in the drum 100. Penetrating holes 119 are made under the hub receivers 106a and 106b in the drum 100.

The hubs 60a and 60b at the position $P_1$ of drum 100 are transferred to the hub chucks 73 and 74 positioned at the first station lst of the rotary table 58. A pair of hub transfer assembles 179 to be moved up and down by air cylinders (not shown) are arranged directly under the hub receivers 106a and 106b located at the first position $P_1$. As is apparent from FIG. 6, the hub transfer assemblies 179 are so designed as to be movable upwardly from below through penetrating holes 120 in the drum base 101, the penetrating holes 119 of the drum 100, and penetrating holes 121 made in the disc 104, to the lower ends of the hub chucks 73 and 74.

As shown in FIG. 13A to FIG. 13c, each of the hub transfer assemblies 179 consists of a hub engaging member 180 which has a conical top end 180a and six lengthwise grooves 180b for engaging with a six detents 83 of the hub 60a or 60b, and a cylindrical hub lifting member 181 whose upper end 181a is adapted to contact the hub 60a or 60b. The hub engaging member 180 and the respective cylindrical hub lifting members 181 are so designed to move up and down in relation to each other. The hub engaging members 180 are not rotatable.

In response to operations of the hub supply mechanism 88 and the hub positioning mechanism 99, a pair of hubs 60a and 60b are supplied by hub pushers 95 through the hub paths 96a and 96b to the hub receivers 106a and 106b located at the position $P_1$. Concurrently with the right ward or return (FIG. 7) movement of the hub pushers 95, the drive gear 113 starts to rotate. The drum 100 is rotated one third revolution in the direction shown by the arrow on FIG. 7 through the intermediate gear 112 and the larger gear 111. The supplied hubs 60a and 60b are transported to the second position P₂, while they are pressed between the inner circumferential surface 103a of the annular wall 103 and the circumferential surface of the frictional roller 107. The hubs 60a and 60b are rotated around their own axes with the rotation of the frictional roller 107, so as to be positioned in predetermined directions. Before such positioning, the hub positioning tongues 115a and 115b are pushed, at the ends 115a′, by the circumferential surfaces of the hubs 60a and 60b against the compression spring 116 and so retracted from the forward positions. After the drum 100 is rotated one third revolution and stops, the next pair of hubs 60a and 60b are supplied to the hub receivers 106a and 106b located at the position P₁ by the hub pushers 95 in the same manner as above described.

The above described hub supply operation and intermittent rotation of the drum 100 are repeated. With one revolution of the drum 100, the first supplied hubs 60a and 60b are returned through the positions P₂ and P₃ to the first position P₁.

During the rotation of the drum 100, the three planetary gears 109 revolve around the stationary gear 110, and are rotated around their own axes. With the rotation of the planetary gears 109, the three frictional rollers 107 are rotated through shafts 108 in the direction shown by the arrows on FIG. 7. The hubs 60a and 60b are frictionally rotated in the directions shown by the arrows on FIG. 7 with the rotation of the frictional rollers 107. Thus, the ends 115a′ and 115b′ of the hub positioning tongues 115a and 115b come to fit in the cut-out portions 85 of the hubs 60a and 60b, and are projected into the cut-out portions 85 of the hubs 60a and 60b by the compression spring 116. The hubs 60a and 60b are fixed in the hub receivers 106a and 106b and in predetermined rotational positions.

Once the hubs 60a and 60b are disposed in the predetermined positions, the hubs 60a and 60b are no longer rotated around their own axes with further rotation of the drum 100 for returning the hubs to the position P₁ and, during such further rotation of drum 100, hubs 60a and 60b merely slip on the inner circumferential surface 103a of the annular wall 103.

When the first supplied hubs 60a and 60b have returned to the first position P₁, the pair of hub transfer assemblies 179 located at the position P₁ start to move upward. First, the hub engaging members 180 are inserted through the holes 84 of the hubs 60a and 60b, and engaged at the grooves 80b with the detents 83 of the hubs 60a and 60b, while the hubs 60a and 60b are maintained in the predetermined positions. Then the hubs 60a and 60b are lifted up by the upper surfaces 181a of the hub lifting members 181. Thus, the hubs 60a and 60b are transferred to the lower ends of the hub chucks 73 and 74.

Next, details of the rotary chuck 73 will be described with reference to FIG. 9 to FIG. 13c.

Figure 9:
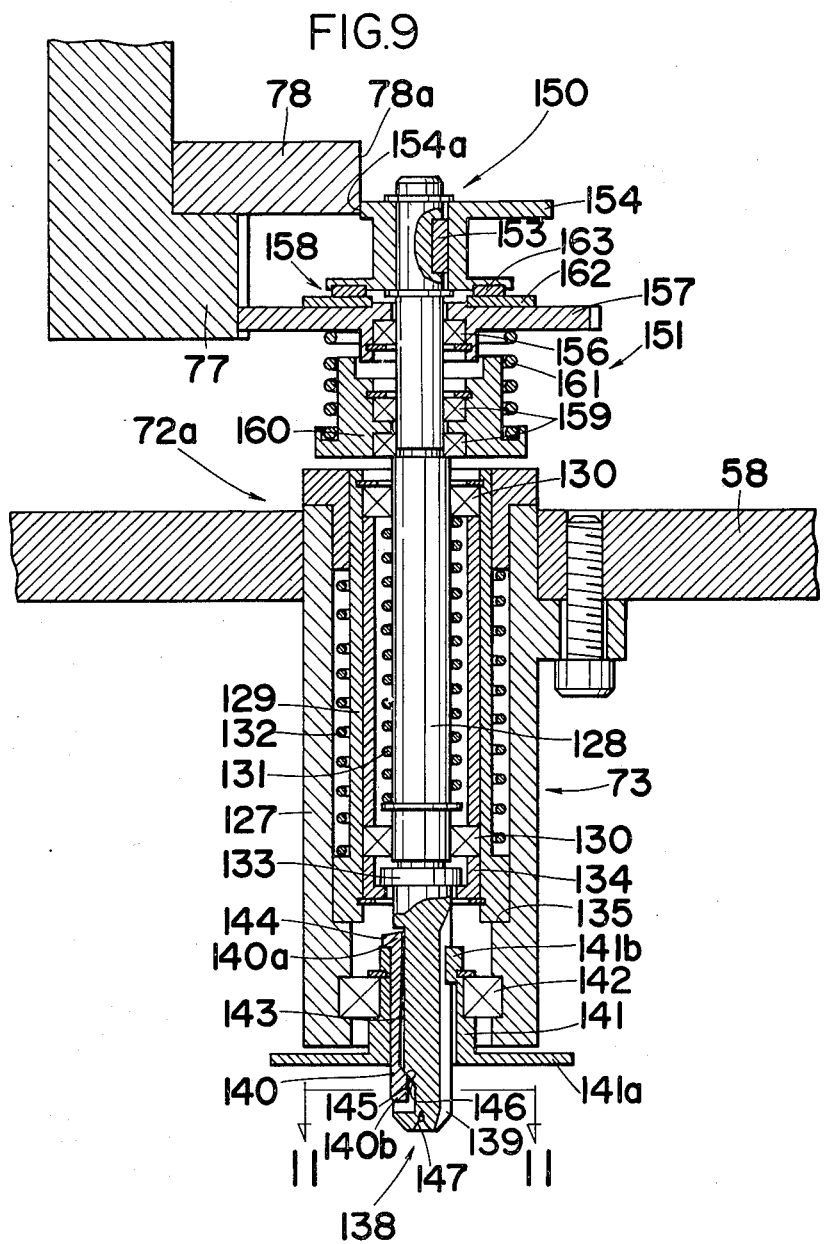
FIG. 9 and FIG. 10 are enlarged cross-sectional views of a rotary hub chuck and associated parts in the apparatus of FIG. 1.

As above described, the eight rotary hub chucks 73 are arranged at the regular angular intervals on the rotary table 58 along the periphery of the latter, and such chucks 73 are vertically held by cylindrical holders 127 fixed to the rotary table 58 (FIG. 9). Hub holding shafts 128 pass through the cylindrical holders 127, and are rotatably supported through a pair of bearings 130 by movable cylinders 129 so as to permit axial sliding of each shaft 128 relative to the respective cylinders 129. The movable cylinders 129 are fitted into the cylindrical holders 127 so as to be slidable relative to the latter. The hub holding shafts 128 are urged downwardly by compression springs 131 extended between the hub holding shafts 128 and the movable cylinders 129. The movable cylinders 129 are urged downwardly by compression springs 132 extended between the movable cylinders 129 and the cylindrical holders 127. The spring constant of the compression springs 132 is larger than that of the compression springs 131. Annular projections 133 on the hub holding shafts 128 contact with annular stoppers 134 fixed at the lower ends of the movable cylinders 129 to determine the lower positions of the hub holding shafts 128. The lower ends of the movable cylinders 129 contact with inward annular projections 135 made in the lower ends of the cylindrical holders 127 to determine the lower positions of the movable cylinders 129.

A hub holding mechanism 138 defined by each of the lower end portions of the hub holding shafts 128 includes six hub engaging grooves 139 made in the lower end portion of the hub holding shaft 128, and six hub holding fingers 140 arranged around the lower end portion of the hub holding shaft 128 and between the adjacent hub engaging grooves 139. The lower end portion of the hub holding shaft 128 is surrounded by a rotary cylinder 141 having a radial flange which defines a hub receiving plate 141a at its lower end. The rotary cylinder 141 is rotatably supported through bearings 142 by the lower end portion of the cylindrical holder 127. Detents 141b formed on the upper end of the rotary cylinder 141 are engaged with the hub engaging grooves 139 of the hub holding shaft 128. Accordingly, the rotary cylinder 141 is designed to be rotated with the hub holding shaft 128, but is held against up and down movement with the hub holding shaft 128. The hub holding fingers 140 are loosely fitted into lengthwise grooves 143 made in the lower end portion of the hub holding shaft 128. Outward projections 144 are formed on the upper ends 140a of the hub holding fingers 140. The lower surfaces of the outward projections 144 contact with the upper surface of the rotary cylinder 141. Inward projections are formed on the lower ends 140b of the hub holding fingers 140. Cams 145 are formed on the upper surfaces of the inward projections. Mating cams 146 are formed in the lower ends of the grooves 143. The cams 145 are so designed as to contact with the mating cams 146. A conical recess 147 is formed in the lower end of the hub holding shaft 128 so as to be fitted to the conical upper end of the hub transfer member 180.

A position regulation mechanism 150 for the hub holding shaft 128 and a tape winding mechanism 151 are arranged at the upper end portion of the hub holding shaft 128.

The position regulation mechanism 150 includes a positioning block 154 attached to the top end of the hub holding shaft 128 by a key 153, cooperating with the cams 78 and 79. As apparently is shown in FIG. 2, the positioning block 154 is substantially triangular and has sides 154a which are substantially arcuate so as to closely contact with the surfaces 78a and 78b of the cams 78 and 79. It is required with the positioning block 154 be polygonal that the number of the detents 83 of the hub 60a or 60b being an integral multiple of the number of the sides of the positioning block 154.

The tape winding mechanism 151 includes a tape winding gear 157 rotatably supported through bearings 156 by the hub holding shaft 128 and being slidable along the hub holding shaft 128 for engagement with the stationary gear 77. A frictional clutch 158 is arranged between the positioning block 154 and the tape winding gear 157. The tape winding gear 157 is urged upward by a compression spring 161 extended between the tape winding gear 157 and a spring receiver 160 rotatably supported through a pair of bearings 159 by the hub holding shaft 128. Accordingly, the clutch 158 is constituted by a clutch shoe 162 attached to the upper surface of the tape winding gear 157 and being pressed against another clutch shoe 163 attached to the lower surface of the positioning block 154.

As shown on FIG. 14, each of the eight stationary hub chucks 74 arranged at the regular angular intervals on the rotary table 58 along the periphery of the latter is vertically supported on the stationary hub chuck 74 is vertically supported on the rotary table 58 by a cylindrical holder 166. A hub holding mechanism 173 similar to the hub holding mechanism 138 of the rotary hub chuck 73 is arranged in the stationary hub chuck 74, which includes a hub holding shaft 167, a movable cylinder 168, compression springs 169 and 170, hub engaging grooves 171 and hub holding fingers 172. The hub holding shaft 167 of the stationary hub chuck 74 is slidable in the vertical direction, but not rotatable, while the hub holding shaft 128 of the rotary hub chuck 73 is both slidable and rotatable. A cylindrical member 174 is fixed to the lower end of the cylindrical holder 166. A hub receiving plate 174a is formed integrally with the lower end of the cylindrical member 174. Inward projections 174b are formed on the upper portion of the cylindrical member 174, and are engaged with the hub engaging grooves 171 to prevent the rotation of the hub holding shaft 167.

Next, the transferring of the hubs 60a and 60b to the hub chucks 73 and 74 will be described.

When a pair of hub chucks 73 and 74 are transported to the first station 1st from the eighth' station 8st with the intermittent rotation of the rotary table 58, the next hub trnsferring operation is started. The positioning block 154 of the rotary hub chuck 73 is guided by the leaf sprig 80, and rides on the stationary cam 78. One of the sides 154a of the positioning block 154 comes into contact with the surface 78a of the stationary cam 78, as shown in FIG. 2. And the direction of the positioning block 154 is restricted. The hub holding shaft 128 is maintained at the position shown in FIG. 9, until the rotary hub chuck 73 reaches the fourth station 4st because the positioning block 154 moves in contact with the surface 78a of the stationary cam 78 and then with the surface 79a of the movable cam 79 between the first station 1st and the fourth station 4st.

The pair of hubs 60a and 60b which have been disposed in the predetermined positions by the hub positioning mechanism 99, are located at the position $P_1$ of the hub positioning mechanism 99 corresponding to the first station 1st for the rotary table 58. The hub chucks 73 and 74 transported from the eighth station 8st are stopped directly above the hubs 60a and 60b located at the position $P_1$ for the hub positioning mechanism 99.

Next, transfer of the hub 60a of the rotary hub chuck 73 will be specifically described, and it will be understood that transfer of the hub 60b to the stationary hub chuck 74, although not specifically described, is similar to the transfer of the hub 60a to the rotary hub chuck 73.

Figure 11:
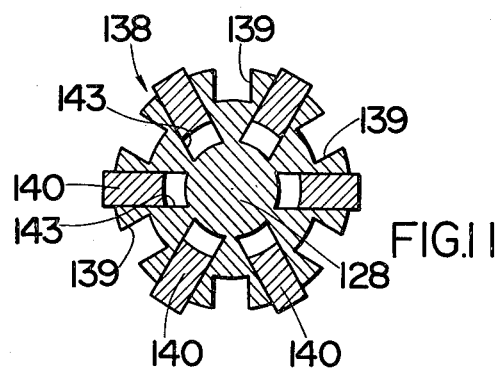
FIG. 11 is an enlarged cross-sectional view taken along the line 11—11 of FIG. 9.

Before the transfer of the hub 60a, the hub holding shaft 128 of the rotary hub chuck 73 is located at the lower position by the compression spring 131. The cams 146 formed on the lower end of the hub holding shaft 128 are pressed against the cams 145 of the hub holding fingers 140. By the cooperative action of the cams 146 and 145, outwardly directed forces are applied to the lower ends 140b of the hub holding fingers 140, to rotate the latter in the clockwise direction (FIG. 9) round the projections 144 formed on the upper ends of the hub holding fingers 140. Accordingly, the lower end portions of the fingers 140 are somewhat projected from the grooves 143 of the hub holding shaft 128, as shown in FIG. 11.

When the positioned hub 60a is lifted up by the hub transfer assembly 179, the conical upper end 180a of the hub engaging member 180 is first fitted into the conical recess 147 of the lower end of the hub holding shaft 128 to lift the latter by a stroke $S_1$ (FIG. 13A) against the compression spring 131. With the lifting of the hub holding shaft 128, the cams 146 are slightly separated from the cams 145 of the hub holding fingers 140. Accordingly, the hub holding fingers 140 are rotated due to their own weights, in the counter-clockwise direction (FIG. 13A) round the projections 144, and the lower end portions 140b of the fingers 140 are withdrawn into the grooves 143.

The hub lifting member 181 further moves upward. After the movement of the hub engaging member 180 stops, the hub 60a is disengaged upwardly from the hub engaging member 180 by the upward pushing action of the hub lifting member 181. Thus, the hub 60a is moved onto to the lower end of the hub holding shaft 128, as shown in FIG. 13B. The detents 83 of the hub 60a are engaged with the hub engaging grooves 139 of the hub holding shaft 128. The upward movement of hub lifting member 181 stops in the condition that the hub 60a is pressed between the lower surface of the hub receiving plate 141a and the upper end of the hub lifting member 181.

Figure 10:
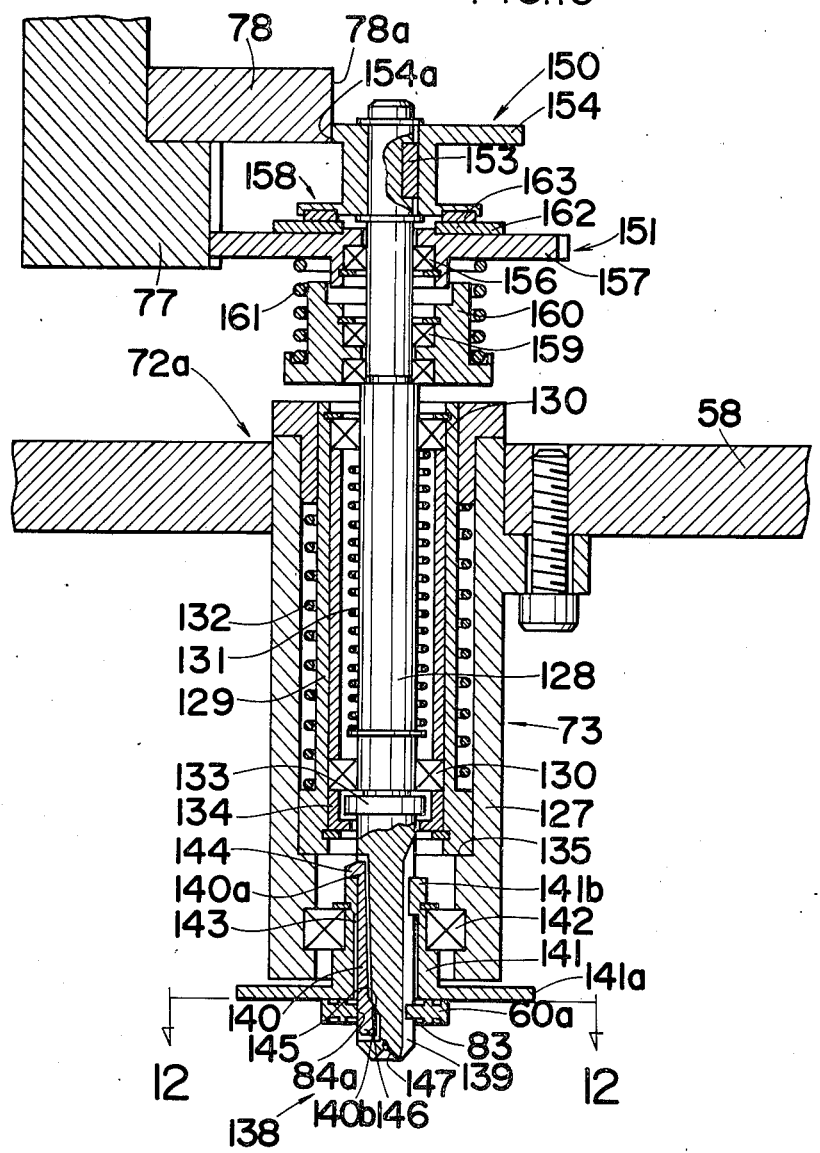
Figure 12:
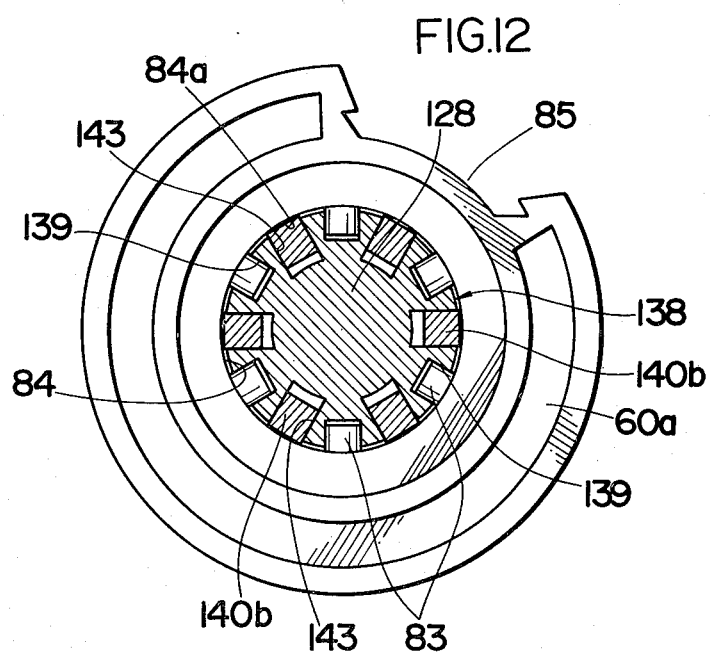
FIG. 12 is an enlarged cross-sectional view taken along the line 12—12 of FIG. 10.

Next, only the hub engaging member 180 is moved downward, as shown in FIG. 13C. The hub holding shaft 128 is moved down by stroke $S_2$ by the compression spring 131. The cam 146 is pushed against the cam 145 of each hub holding finger 140 and, by the cooperative action of the cams 146 and 145, the lower ends 140b of the fingers 140 are slightly projected outwardly from the grooves 143, and thereby pressed against the inner circumferential surface 84a of the hub hole 84, as shown in FIG. 12. Thus, the hub 60a is held by the hub holding shaft 128, as shown in FIG. 10, even when the hub lifting member 181 is moved downward. The hub transfer assembly 179 is moved back to its original position shown in FIG. 6. Thus, the hub transfer operation is completed.

When the hub 60a is to be removed from the hub holding shaft 128, the latter is slightly pushed upward to withdraw the lower ends 140b of the fingers 140 into the grooves 143. The hub 60a falls from shaft 128 due to its own weight.

After the transfer of the hubs 60a and 60B at the first station 1st, the hubs 60a and 60b held at the lower ends of the hub chucks 73 and 74 are transported through the second station 2st to the third station 3st with the intermittent rotation of the rotary table 58. The tape winding gear 157 engaged with the stationary gear 77 is rotated with the rotation of the rotary table 58. However, since the clutch shoes 162 and 163 slip relative to each other, the rotational force of the tape winding gear 157 is not transmitted to the hub holding shaft 128 and the latter does not rotate. Thus, the hubs 60a and 60b are transported to the third station 3st without rotation.

Next, a position detection mechanism for the hubs 60a and 60b at the third station 3st will be described with reference to FIG. 15 to FIG. 19.

The position detection mechanism 185 is arranged directly under the hub chucks 73 and 74 stopped at the third station 3st, and is comprised of two parts 185a and 185b for respectively detecting the existence and direction of the hub 60a and the existence and direction of the hub 60b. Each of the detecting parts 185a and 185b has a first cylindrical detecting member 186 (FIG. 16) for detecting the existence of the hub 60a or 60b, and a second cylindrical detecting members 187 for detecting the direction of the hub 60a or 60b, The first cylindrical detecting member 186 is loosely fitted into the second cylindrical detecting member 187. The upper end surface 186a of the first cylindrical detecting member 186 is so designed as to contact with the lower surface of the hub 60a or 60b. A projection 187b formed on the upper end surface 187a of the second cylindrical detecting member 187 is so designed as to closely fit into the cut-out portion 85 of the hub 60a or 60b. The first and second cylindrical detecting members 186 and 187 are concurrently lifted by a lift assembly 188 which is driven by an air cylinder (not shown). The first detecting member 186 is loosely fitted on a thin upper rod 189 of the lift assembly 188, while the second detecting member 187 is loosely fitted on a thick lower rod 190 of the lift assembly 188. The first detecting member 186 is urged upward by a compression spring 191 surrounding the thin upper rod 189 between the lower surface of the first detecting member 186 and the upper surface of the thick lower rod 190. The second detecting member 187 is urged upward by a compression spring 192 surrounding the thick lower rod 190 between the lower surface of the second detecting member 187 and a flange 193 fixed to the lower end of the thick lower rod 190. A flange 194 is fixed to the upper end of the thin upper rod 189 to prevent the latter from falling out from the first detecting member 186. A pin 195 is fixed on the upper rod 189 perpendicularly to the length of the latter, and is inserted into oblong holes 196 and 197' made in the first and second detecting members 186 and 187. Accordingly, the first and second detecting members 186 and 187 are prevented from rotating relative to each other, by the pin 195, and so are positioned in the predetermined directions relative to the lift assembly 188.

Slits 197 and 198 are formed in the circumferential surfaces of the first and second detecting members 186 and 187, to discriminate between the relative axial positions of the first and second detecting members 186 and 187. The relative positions of members 186 and 187 may be discriminated in the hub position detection mechanisms 185a and 185b independently of each other. However, in this embodiment, the relative positions of the members 186 and 187 in the hub position detection mechanisms 185a and 185b are discriminated in common with each other by one photo-sensor. Accordingly, it is possible to confirm whether both of the hubs 60a and 60b are held by the hub chucks 73 and 74 in the normal conditions or not. The photo-sensor consists of a light-emitting element 199 and a photo-sensing element 200.

Next, operation of the hub position detection mechanism 185a for the hub 60a will be described. The description of operation of the hub position detection mechanism 185b for the hub 60b will be omitted as the operation of the hub position detection mechanisms 185a and 185b are substantially the same.

Figure 17A:
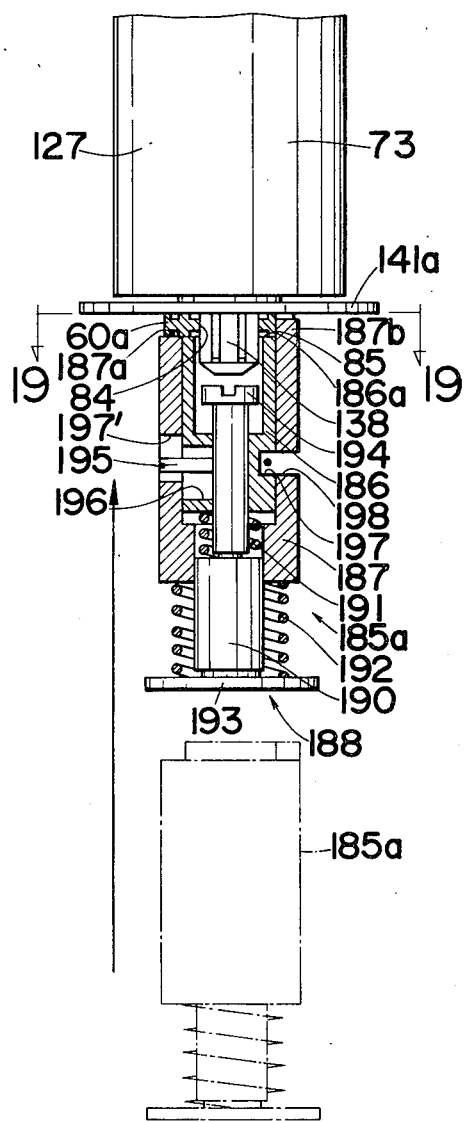

When the hub chucks 73 and 74 holding the hubs 60a and 60b stop at the third station 3st, the lift assembly 188 is moved upward to the upper position shown by the solid line on FIG. 17A from the lower position shown by the dot-dash line. FIG. 17A and FIG. 18A show the case in which a hub 60a is surely held by the lower end of the rotary hub chuck 73 so as to normally position the cut-out portion 85 of the hub 60a.

With the upward movement of the lift assembly 188, the first and second detecting members 186 and 187 are moved upward to push against the hub 60a at the upper end surfaces 186a and 187a against the compression springs 191 and 192 as shown by the solid line on FIG. 17A. Since the hub 60a is correctly positioned projection 187b is inserted into the cut-out portion 85 of the hub 60a.

When the hub 60a is located in the normal condition, the slits 197 and 198 of the first and second detecting members 186 and 187 are aligned with each other, as shown in FIG. 17A and 18A. The light from the light emitting element 199 passes through the slits 197 and 198 and is incident on the photo-sensing element 200. As the result, the discrimination signal that the hub 60a is located in the normal condition, is transmitted from the photo-sensing element 200.

FIG. 17B and FIG. 18B show the case in which a hub 60a is not held by the lower end of the rotary hub chuck 73. In the case, the first and second detecting members 186 and 187 come into contact with the hub receiving plate 141a of the rotary hub chuck 73. The second detecting member 187 stops substantially at the same level as shown in FIG. 17A and FIG. 18A. However, the level of the first detecting member 186 is substantially higher than the level shown in FIG. 17A and FIG. 18A. Accordingly, the slits 197 and 198 are shifted relative to each other. The light from the light emitting element 199 is intercepted by the circumferential surface of the first detecting member 186, and not incident on the photo-sensing element 200. As the result, the above described discrimination signal is not obtained from the photo-sensing element 200.

FIG. 17c and FIG. 18c show the case that the hub 60a is held by the lower end of the rotary hub chuck 73, but that the cut-out portion 85 is not positioned in the normal direction. In that case, the first detecting member 186 stops at the same level as shown in FIG. 17A and FIG. 18A, but the projection 187b of the second detecting member 187 contacts with the lower surface of the hub 60a, that is, cannot enter cut-out portion 85, and the level of the second detecting member 187 is substantially lower than the level thereof shown in FIG. 17A and FIG. 18A. Accordingly, the slits 197 and 198 are shifted relative to each other. The light from the light emitting element 199 is intercepted by the circumferential surface of the second detecting member 187. As the result, the above described discrimination signal is not obtained from the photo-sensing element 200.

As above described, when the descrimination signal is not obtained from the photo-sensing element 200, this means that the hub 60a is not held by the lower end of the rotary hub chuck 73, or the cut-out portion 85 of the hub 60a is not positioned in the normal direction. Similarly, the discrimination signal is not obtained from element 200 when a hub 60b is not held by chuck 74 or when the hub 60b is incorrectly positioned. After the detecting operation, the hub position detection mechanism 185a and 185b are moved down to their original positions by the lift assembly 188. The hubs 60a and 60b held by the hub chucks 73 and 74 are then transported to the third station 3st with the intermittent rotation of the rotary table 58.

Next, there will be described a tape winding mechanism for the one hub 60a at the fourth station 4st and a tape clamping mechanism for the hubs 60a and 60b, disposed at the fourth station 4st and the fifth station 5st, respectively.

First, a tape clamping mechanism 203 will be described with reference to FIG. 20 to FIG. 27. In the tape clamping mechanism 203, the initial end of the tape 55 is clamped to one of the hubs 60a and 60b, and particularly to the hub 60a, transported to the fourth station 4st, and concurrently the terminal end of the previously wound tape 55 is clamped to the other of the hubs 60a and 60b, that is, to the hub 60b already transported to the fifth station 5st. As above described, a pair of leader tapes are connected to the ends of each magnetic tape piece in the tape 55. The tape 55 is clamped at the leader tape portion to the hub 60a or 60b.

The tape clamping mechanism 203 includes a supply mechanism 204 for the clamp pieces 86a and 86b, a pair of clamp piece drive mechanisms 205a and 205b, (FIG. 21) and a tape holding unit 206 functioning to cut and distribute the tape 55. The clamp piece drive mechanisms 205a and 205b are arranged inside the orbit of the hub chucks 73 and 74, so as to face the hub 60a of the hubs 60a and 60b transported the fourth station 4st and to the hub 60b of the hubs 60a and 60b transported to the fifth station 5st. The tape holding unit 206 is located between the fourth station 4st and the fifth station 5st, and is reciprocated between its operative position shown by the dot-dash line in FIG. 20 and an inoperative position shown by the solid line in FIG. 20. The clamp piece drive mechanisms 205a and 205b are assembled into a stand 207.

Figure 25:
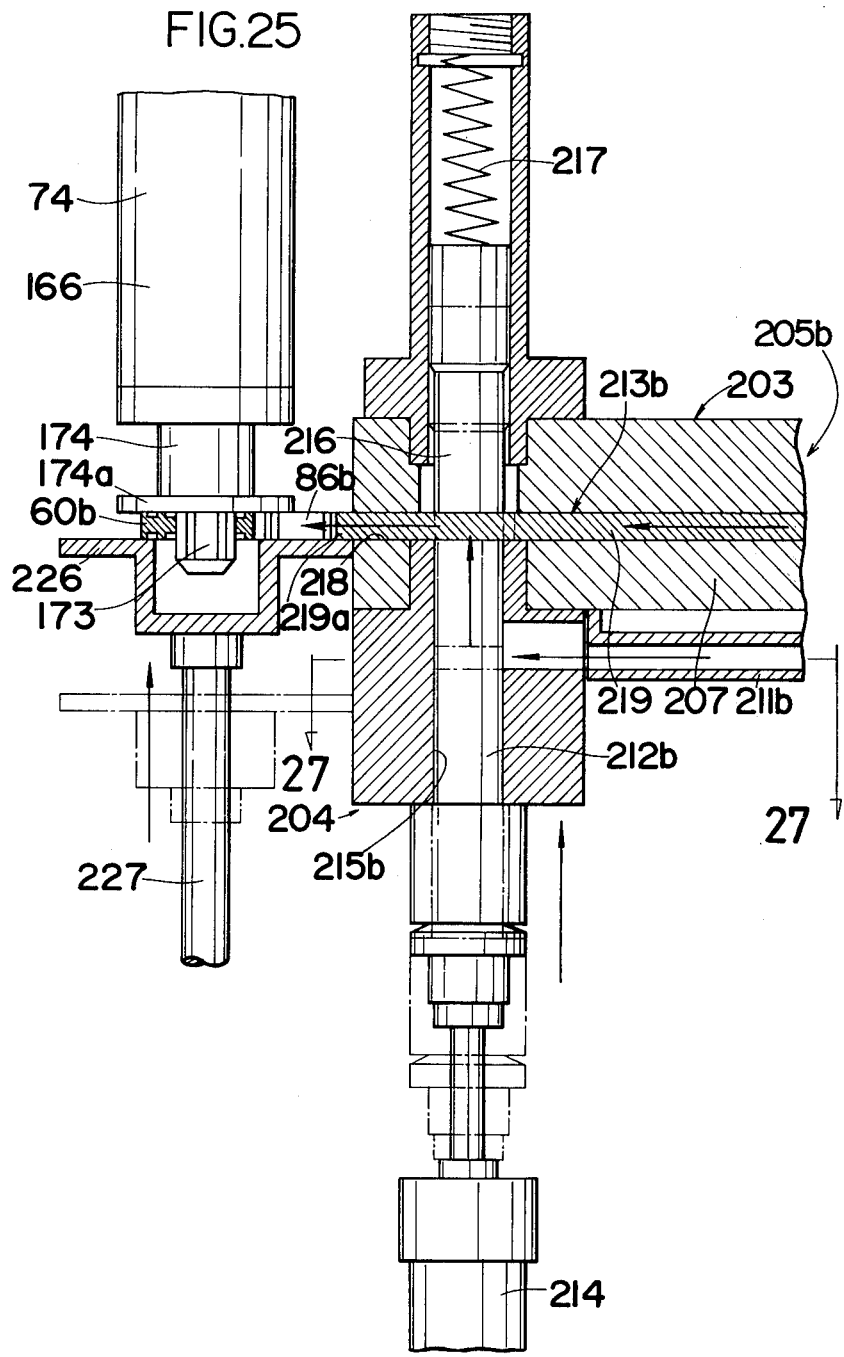
FIG. 25 is an enlarged cross-sectional view taken along the line 25—25 of FIG. 21.
Figure 26:
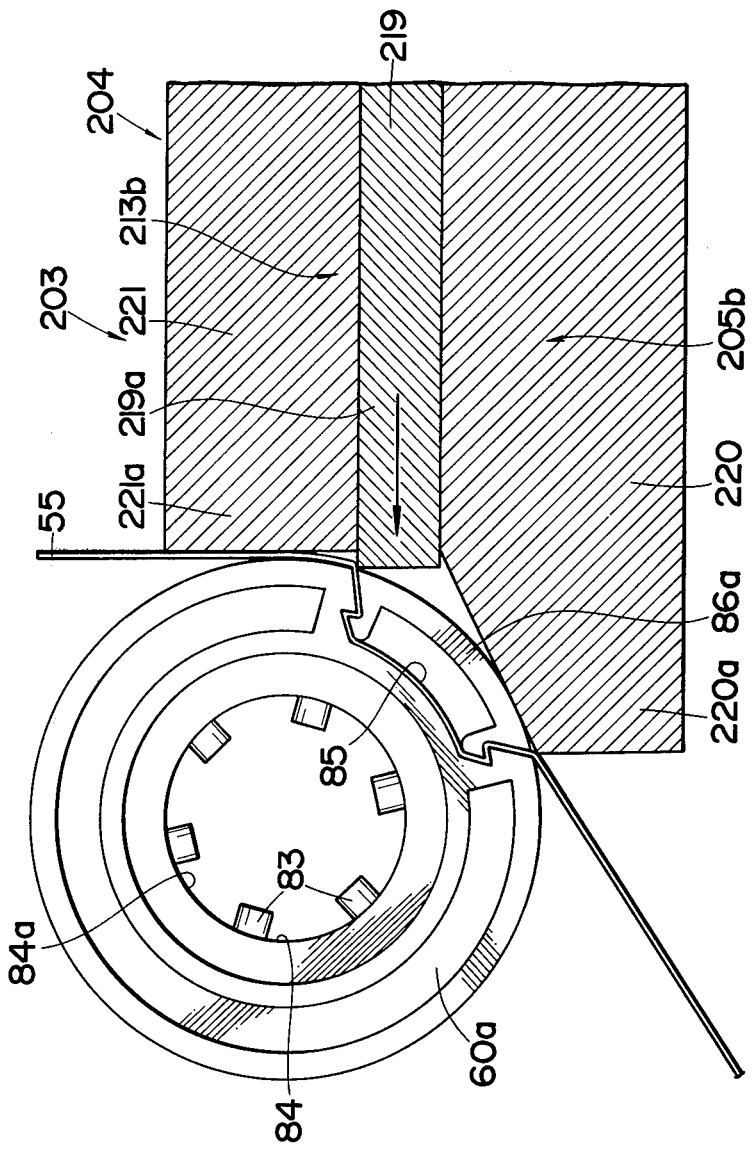
FIG. 26 is an enlarged cross-sectional view of a clamp piece engaged with a hub.
Figure 27:
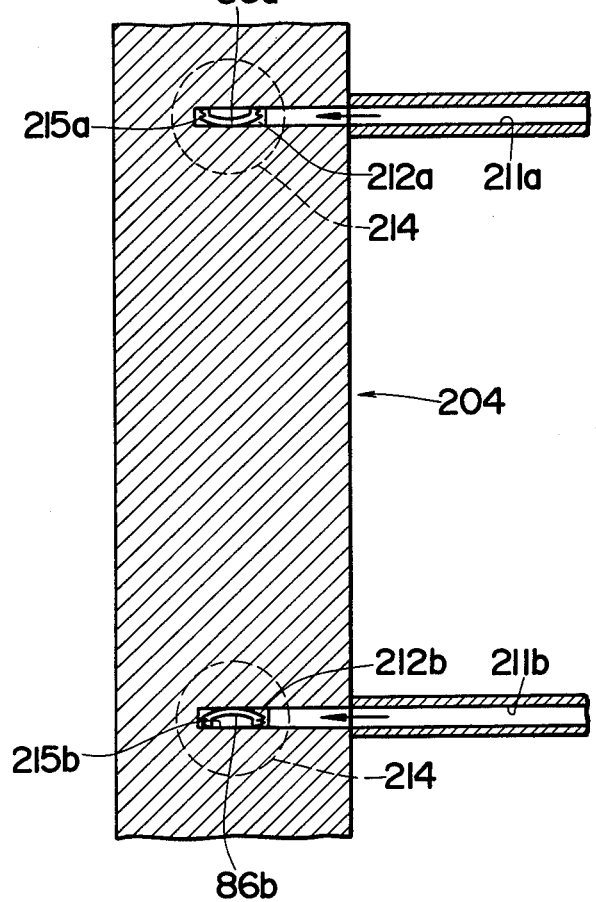
FIG. 27 is a cross-sectional view taken along the line 27—27 of FIG. 25.

In the clamp piece supply mechanism 204 shown by FIG. 25 to FIG. 27, the clamp pieces 86a and 86b are fed one by one in constant orientation to a pair of air chutes 211a 211b (FIG. 27) by a vibratory feeder or a rotary feeder (both not shown), and then simultaneously supplied to upper ends of a pair of loading arms 212a and 212b from the air chutes 211a and 211b at the predetermined timing. The clamp pieces 86a and 86b may be sensed by photo-sensors (not shown) in the air chutes 211a and 211b so as to be surely supplied to the upper ends of the pair of loading arms 212a and 212b.

Figure 21:
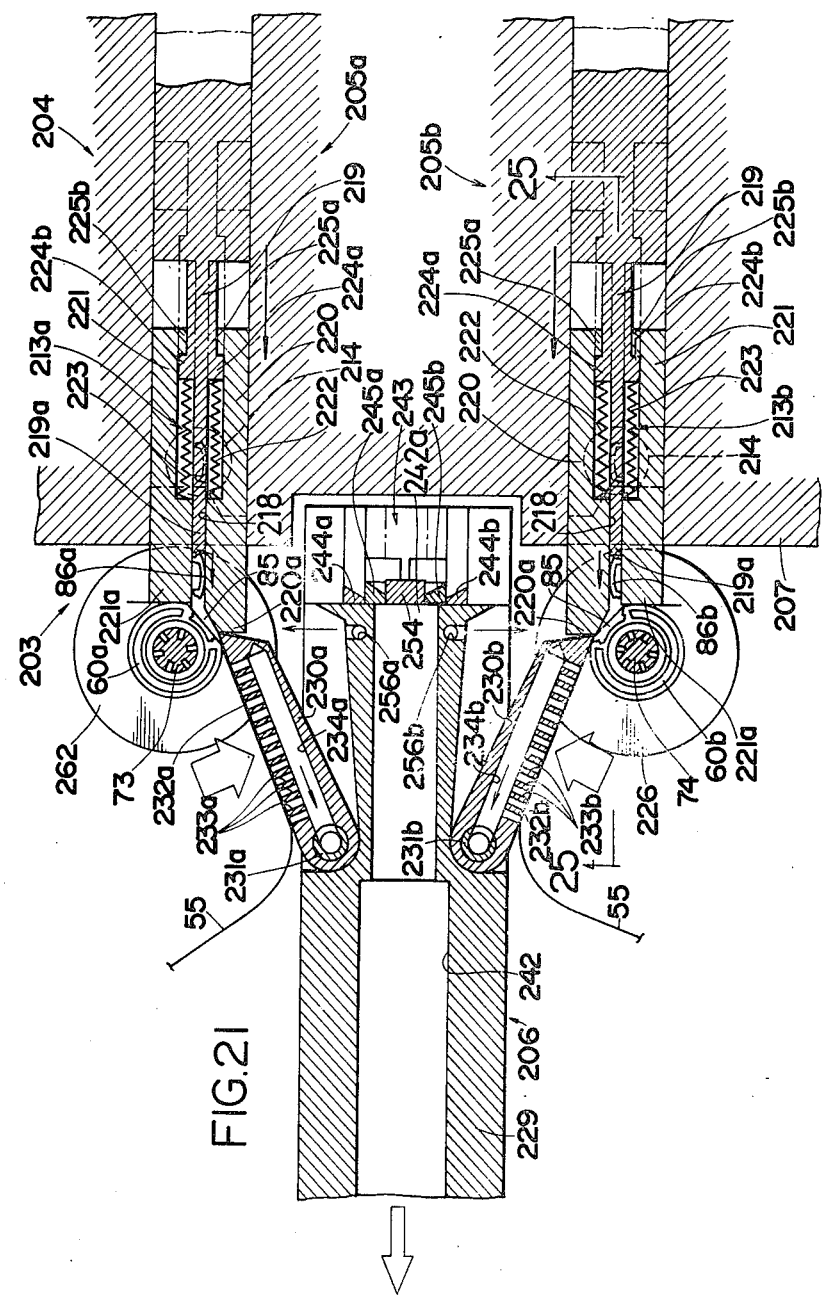
FIG. 21 is an enlarged plan view of an important part of the tape clamping mechanism of FIG. 20.

The loading arms 212a and 212b are moved up and down in a pair of vertical guide holes 215a and 215b by air cylinders 214. The clamp pieces 86a and 86b are lifted to clamp piece drive positions 213a and 213b (FIG. 21 and FIG. 25). As described hereafter, the clamp pieces 86a and 86b are driven through paths 218 to the hubs 60a and 60b by the clamp piece drive mechanisms 205a and 205b. Pushing arms 216 are arranged in the upper portions of the guide holes 215a and 215b, and urged downward by compression springs 217. The clamp pieces 86a and 86b are stably positioned at the clamp piece drive positions 213a and 213b between the pushing arms 216 and the loading arms 212a and 212b.

The clamp piece drive mechanisms 205a and 205b are equal to each other in construction, and arranged symmetrically with each other. The clamp piece drive mechanism 205a or 205b includes a drive arm 219 and a pair of side arms 220 and 221 which are arranged at both sides of the drive arm 219 (FIG. 21). The drive arm 219 is designed to be reciprocated by an air cylinder (not shown). The side arms 220 and 221 are slidable relative to the drive arm 219. When the drive arm 219 is moved leftward (FIG. 21) the side arms 220 and 221 are pushed leftward through compression springs 222 and 223. When the drive arm 219 is moved rightward (FIG. 21), the side arms 220 and 221 are pushed in the same direction by the engagement of steps 225a and 225b thereon by steps 224a. and 224b of the drive arm 219. As shown in FIG. 25, a clamp piece receiver 226 is arranged directly under the hub 60b when the clamp piece 86b is driven through the path 218 to the hub 60b. Thus, the clamp piece 86b is prevented from falling out by the clamp piece receiver 226 which is so designed as to be moved up and down by an air cylinder (not shown).

Figure 22:
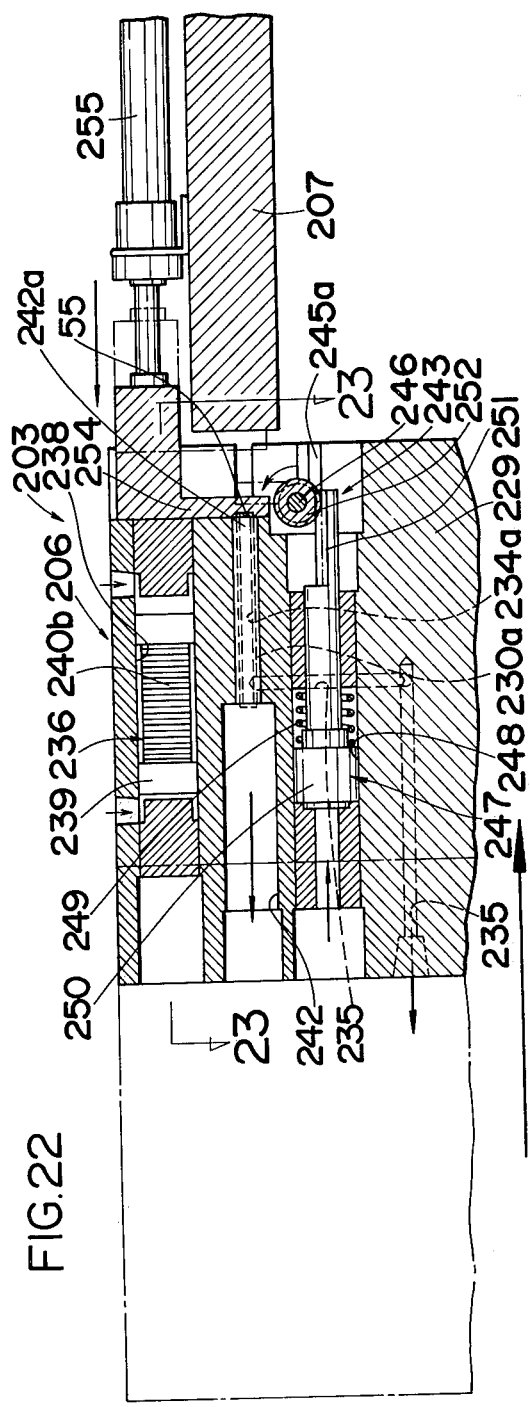
FIG. 22 is an enlarged cross-sectional view taken along the line 22 of FIG. 20.
Figure 23:
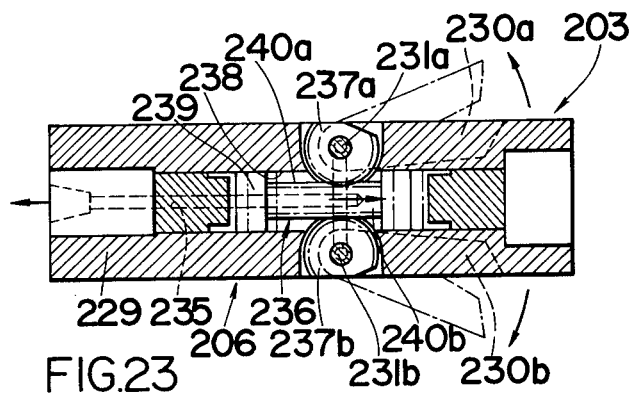
FIG. 23 is a cross-sectional view taken along the line 23—23 of FIG. 22.

In the tape holding unit 206 shown by FIG. 20 to FIG. 24, a pair of vacuum arm 230a and 230b are rotatably supported on the front portion of a main body 229 by cylindrical support shafts 231a and 231b, so as to be flush with the hubs 60a and 60b. Numerous air pores 233a and 233b are provided in tape holding surfaces 232a and 232b of the vacuum arms 230a and 230b and communicate with air suction paths 234a and 234b formed inside the vacuum arms 230a and 230b. The air suction paths 234a and 234b communicate with the interiors of the cylindrical support shafts 231a and 231b which communicate, in turn, with air suction paths 235 (FIG. 22) connected to an air suction mechanism (not shown). The vacuum arms 230a and 230b are so designed as to be rotated between the original positions shown by the solid lines on FIG. 20 and the forward positions shown by the dot-dash lines on FIG. 20 by an air cylinder mechanism 236 assembled into the upper portion of the main body 229 (FIGS. 22 and 23). A pair of pinions 237a and 237b fixed to the upper ends of the cylindrical support shafts 231a and 231b are engaged with a pair of racks 240a and 240b formed on opposed sides of a piston 239 which is reciprocated in a cylinder chamber 238 by compressed air. The vacuum arms 230a and 230b are rotated back and forth through the racks 240a and 240b, the pinions 237a and 237b, and the cylindrical support shafts 231a and 231b, in response to the reciprocation of the piston 239.

Figure 24:
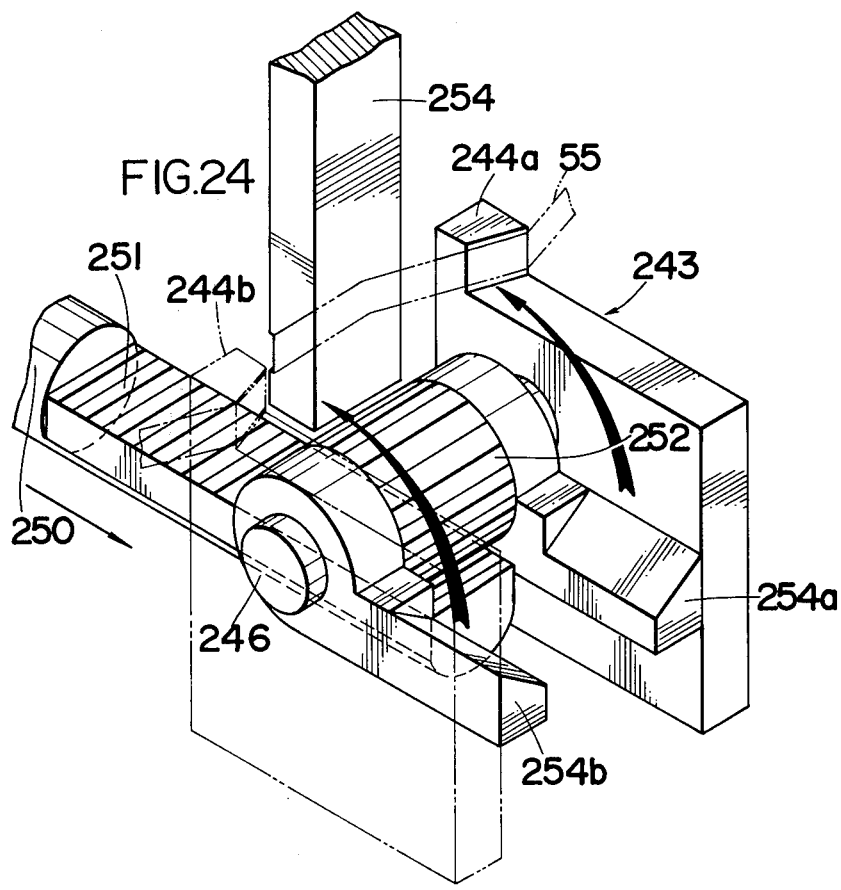
FIG. 24 is an enlarged perspective view of a tape cutter in the mechanism of FIG. 20.

A useless tape suction path 242 is formed in the central portion of the main body 229 between the vacuum arms 230a and 230b. The useless tape suction path 242 is open at the top end of the main body 229, and connected to an air suction mechanism (not shown). A tape cutter 243 is arranged in front of the top opening 242a of the useless tape suction path 242. The tape cutter 243 consists of a pair of stationary cutting edge members 244a and 244b and a pair of rotary cutting edge members 245a and 245b arranged between the stationary cutting edge members (FIG. 24). The rotary cutting edge members 245a and 245b are rotatably supported by a horizontal cutter shaft 246 on the main body 229, and driven by an air cylinder mechanism 247 (FIG. 24) assembled into the lower portion of the main body 229. A pinion 252 fixed concentrically on the cutter shaft 246 is engaged with a rack 251 fixed on the end of a piston 250 which is moved forward by air and moved back by a restoring spring 249 in a cylinder chamber 248. The rotary cutting edge members 245a and 245b are rotated back and forth through the rack 251, the pinion 252 and the cutter shaft 246 with the reciprocation of the piston 250. A tape pushing member 254 is arranged in front of the top opening 242a of the main body 229, and so designed as to be moved between the original position shown by the dot-dash line on FIG. 20 and the forward position shown by the solid line on FIG. 20 by an air cylinder 255 supported on the stand 207 (FIG. 2). Referring to FIG. 21, a pair of air blow openings 256a and 256b are shown to be formed in the opposite sides of the top end portion of the main body 229.

Figure 28:
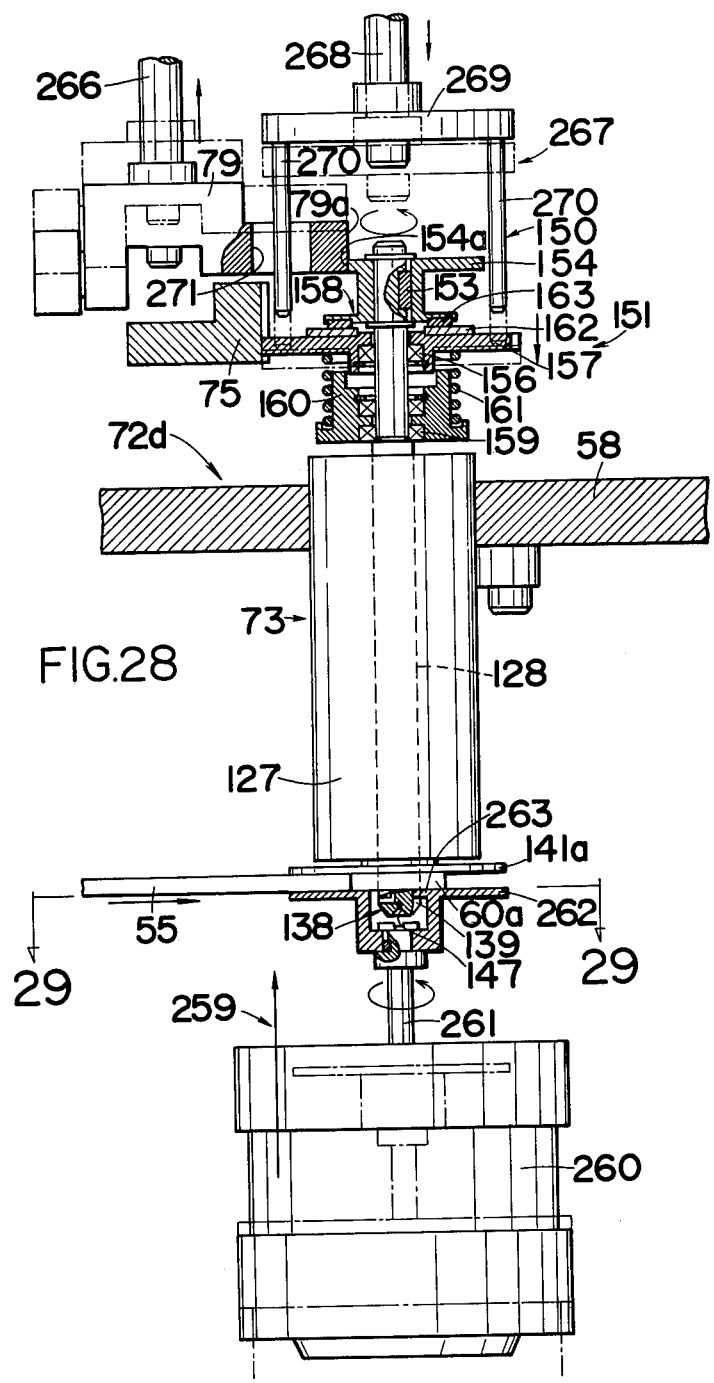
FIG. 28 is an enlarged cross-sectional view of a tape winding mechanism, as viewed along the line 28-28 of FIG. 2.
Figure 29:
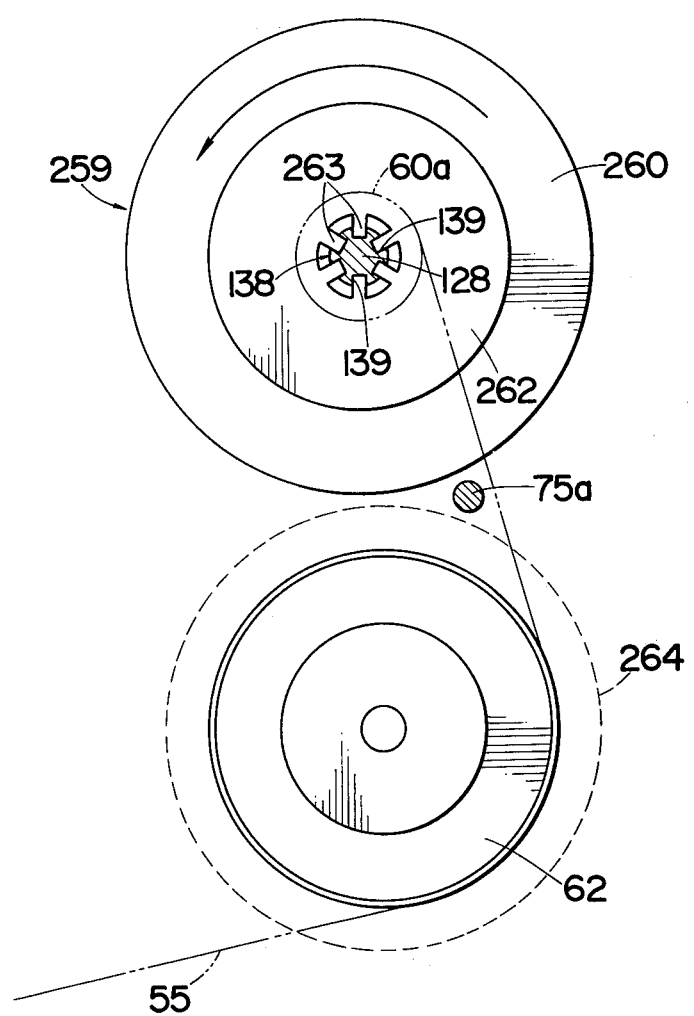
FIG. 29 is a cross-sectional view taken along the line 29—29 of FIG. 28.

FIG. 28 and FIG. 29 show the tape winding mechanism 259 which includes a constant torque motor 260 and a drive plate 262 fixed to the top end of a motor shaft 261 of the motor 260. The motor 260 is arranged directly under the rotary hub chuck 73 at the fourth station 4st, and so designed as to be moved up and down between the original position shown by the dot-dash line on FIG. 28 and the upper position shown by the solid line on FIG. 28. Detents 263 are formed in the drive plate 262 so as to be engaged with the hub engaging grooves 139 of the hub holding shaft 128 (FIG. 29). The drive plate 262 may functions also as the clamp piece receiver 226 described above with reference to the tape clamping mechanism 203.

The movable cam 79 at the fourth station 4st is supported by the lower end of a lift shaft 266 which is driven by an air cylinder (not shown), to be moved up and down between the upper position shown by the dot-dash line on FIG. 28 and the lower position shown by the solid line on FIG. 28. A release mechanism 267 for the frictional clutch 158 is arranged directly above the rotary hub chuck 73 at the fourth station 4st, and includes a lift shaft 268 which is driven by an air cylinder (not shown), a lift plate 269 fixed to the lower end of the lift shaft 268 and four pins 270 depending from the lift plate 269. The tape winding gear 157 is pushed down by the downward movement of the pins 270 against the compression spring 161. The clutch shoes 162 and 163 are separated from each other. Thus, the frictional clutch 158 is released. One of the pins 270 passes through a penetrating hole 271 made in a part of the movable cam 79.

Next, the operations of the tape clamping mechanism 203 and the tape winding mechanism 259 will be described.

Operations of the mechanisms 203 and 259 are started when a pair of hubs 60a and 60b, which have been detected at the third station 3st, have reached the fourth station 4st, an adjacent other pair of hubs 60a and 60b, which has had the tape wound on the hub 60a thereof has reached the fifth station 5st.

Figure 20:
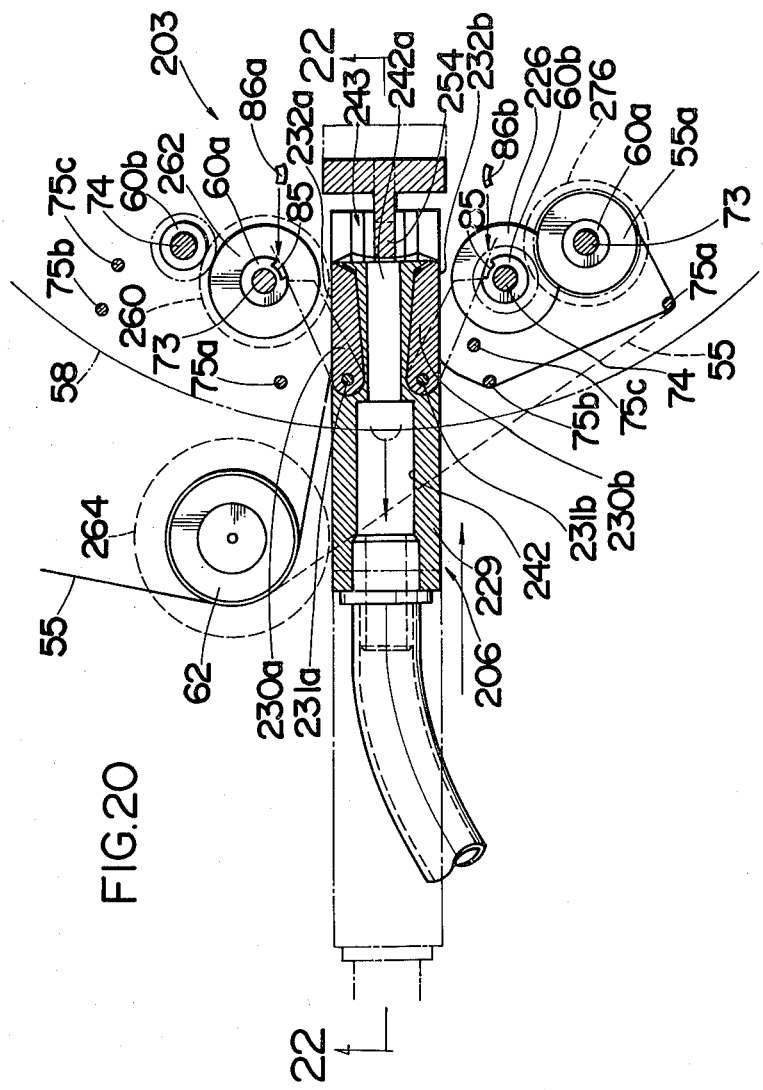
FIG. 20 is an enlarged plan view of a tape clamping mechanism and associated parts in the apparatus of FIG. 1, and which are shown partly broken away.

When the hubs 60a and 60b have been transported to the fifth station 5st from the fourth station 4st, the tape 55 is obliquely extended between the feed roller 62 and the tape guide 75a, as shown by the dotted line on FIG. 20.

Next, the tape holding unit 206 is moved forward from the original position shown by the dot-dash line on FIG. 20 to the operative position shown by the solid line on FIG. 20. Accordingly, the tape 55 is pushed by the front of the main body 229 of the tape holding unit 206. As the result, the tape 55 is U-shapedly extended between the feed roller 62 and the tape guide 75b, as shown by the solid line on FIG. 20. The tape pushing member 254 is moved forward from the original position shown by the dot-dash line on FIG. 20 to the forward position shown by the solid line on FIG. 20 to press the tape 55 against the stationary cutting edge members 244a and 244b. Since air is sucked into the air pores 233a and 233b of the vacuum arms 230a and 230b, the tape 55 is adhered to the tape holding surfaces 232a and 232b of the vacuum arms 230a and 230b.

The rotary cutting edge members 245a and 245b of the cutter 243 are rotated in the direction shown by the arrow on FIG. 24 to cut the tape 55 at two positions in cooperation with the stationary cutting edge members 244a and 244b. The tape scraps are sucked through the top opening 242a into the useless tape sucking path 242 for discarding. Similarly, the useless tapes connected to the ends of the edited tape 55 wound on the tape reels 53a and 53b are sucked into the useless tape sucking path 242 for discarding.

After the tape cutting, the vacuum arms 230a and 230b are rotated as shown on FIG. 21 to apply the tape ends to the hub 60a at the fourth station 4st and to the hub 60b at the fifth station 5st. Since air is blown out toward the tape ends from the air blow openings 256a and 256b, the tape ends are surely applied to the circumferential surfaces of the hubs 60a and 60b at the fourth and fifth stations, respectively.

During the above described operation, a pair of the clamp pieces 86a and 86b are fed to the drive positions 213a and 213b for the clamp piece drive mechanisms 205a and 205b by the clamp piece supply mechanism 204.

Before the clamp piece drive mechanisms 205a and 205b are operated, the tape winding mechanism 259 is moved upward to the upper position shown by the solid line on FIG. 28 from the lower position shown by the dot-dash line on FIG. 28 to almost contact the drive plate 262 with the hub 60a at the fourth station and to engage the detents 263 of the drive plate 262 with the hub engaging grooves 139 of the hub holding shaft 128 of the rotary hub chuck 73, and at the same time, the clamp piece receiver 226 is moved upward to the upper position shown by the solid line on FIG. 25 from the lower position shown by the dot-dash line on FIG. 25 to almost contact with the hub 60b at the fifth station.

The drive arms 219 of the clamp piece drive mechanisms 205a and 205b start to be moved leftward from the original positions shown by the dot-dash lines on FIG. 21. The clamp pieces 86a and 86b are pushed forward through the drive paths 218 onto the drive plate 262 (the clamp piece receiver 226) by the ends 219a of the drive arms 219. The clamp pieces 86a and 86b are driven into the cut-out portions 85 of the hubs 60a and 60b at the fourth and fifth stations, respectively, as shown in FIG. 26 to clamp tape ends to such hubs 60a and 60b.

Since the side arms 220 and 221 are moved leftward through by compression springs 222 and 223 upon leftward movement of the drive arms 219, the clamp pieces 86a and 86b are guided by the side arms 220 and 221, while driven by the drive arms 219 (FIG. 21). The ends 220a and 221a of the side arms 220 and 221 are stopped by the hubs 60a and 60b to press the tape ends between the ends 220a and 221a and the circumferential surfaces of the hubs 60a and 60b. Then, the further strokes of the drive arms 219 are absorbed by the compression springs 222 and 223. The clamp pieces 86a and 86b are driven into the cut-out portions 85 of the hubs 60a and 60b, while the tape ends are pressed between the ends 220a and 221a of the side arms 220 and 221 and the circumferential surfaces of the hubs 60a and 60b. Accordingly, the tape ends are accurately clamped to the hubs 60a and 60b. When the ends 220a and 221a of the side arms 220 and 221 are pressed against the tape ends on the circumferential surfaces of the hubs 60a and 60b, the tape 55 is released from the adhering action of the air sucking pores 233a and 233b of the vacuum arms 230a and 230b. Then, the vacuum arms 230a and 230b are rotated back to their original positions shown by the solid line on FIG. 20. The rotary cutting edge members 245a and 245b of the cutter 243 are rotated back to their original positions. Thus, the tape clamping operations for the hubs 60a and 60b at the fourth and fifth stations, respectively, are completed. The clamp piece drive mechanisms 205a and 205b, the tape holding unit 206, the tape pushing member 254, the clamp piece receiver 226 etc. are moved back to their original positions in preparation for the next tape clamping operations.

Next, the tape winding operation for the hub 60a at the fourth station 4st will be described.

The clutch release mechanism 267 is moved downward to its operative position shown by the dot-dash line on FIG. 28 from the original position shown by the solid line on FIG. 28. The gear 157 is pushed down against the compression spring 161 by the pins 270. The clutch shoes 162 and 163 are separated from each other. At the same time, the movable cam 79 is moved upward to the upper position shown by the dot-dash line on FIG. 28 from the lower position shown by the solid line on FIG. 28, with the result that the movable cam 79 is separated from the positioning block 154. Accordingly, the positioning block 154 becomes rotatable and the rotary hub chuck 73 is free to be rotated.

The constant torque motor 260 starts to rotate. The drive plate 262 is rotated at the high speed through the motor shaft 261. Since the detents 263 of the drive plate 262 are engaged with the hub engaging grooves 139 of the hub holding shaft 128, the rotational force of the drive plate 262 is transmitted to the hub holding shaft 128 through the detents 263 and the hub engaging grooves 139. The hub holding shaft 128 rotates at the high speed.

The hub 60a held by the lower end of the hub holding shaft 128 is rotated at the high speed in the direction shown by the arrow on FIG. 29. The tape 55 is wound on the hub 60a to obtain a wound tape 55a. When the predetermined length of the tape 55 has been wound on the hub 60a, the supply of the tape 55 is stopped, and concurrently the rotation of the constant torque motor 260 is stopped. Thus, the tape winding operation is completed.

After the tape winding operation, the tape winding mechanism 259 is moved down to the original position shown by the solid line on FIG. 28. The clutch release mechanism 267 is moved up to the original position shown by the solid line on FIG. 28 to again press the clutch shoes 162 and 163 against each other.

While the hubs 60a and 60b held by the lower end of the hub chucks 73 and 74 are transported from the fourth station 4st to the fifth station 5st, the movable cam 79 is moved back to the original position shown by the solid line on FIG. 28. In such original position, the circumferential surface 79a of the movable cam 79 is contiguous with the circumferential surface 78a of the stationary cam 78 so as to be engageable by the positioning block 154 of the rotary hub chuck 73 then being transported to the fourth station 4st.

In the above described tape winding operation for the hub 60a at the fourth station, the hub 60a is rotated at the constant torque by the constant torque motor 260. The feed roller 62 is rotated at the constant speed by a constant speed motor 264 having a relatively high torque. The running tape 55 is transported forward to the hub 60a at the constant speed by the feed roller 62. The tape is drawn out from the tape reel 53a driven by the servomotor 54a. Accordingly, the tape load on the feed roller 62 is reduced. The amount of slack of the tape 55 in the vacuum chamber 61 is detected by a photo-sensor arranged in the vacuum chamber 61 to control the speed of the servomotor 54a driving the tape reel 53a. Air may be blown out from the interiors of the guide rollers 63 through openings in the surfaces of the latter contacting tape 55, to reduce the frictional force between the tape 55 and the guide roller 63. This, mechanical losses are reduced and the supply speed of the tape reel 53a can be accurately controlled.

Since the tape supply system and the tape winding system are driven by different drive mechanisms, namely the servomotor 54a and the constant speed motor 264, and the constant torque motor 260, the tape can be supplied almost without tension at the tape supply side, while the tape extending from the feed roller 62 can be wound on the hub 60a with a constant torque, and with constant tightness. The speed of the constant torque motor 260 can be very quickly rised to the desired constant level on starting. The tape can be very efficiently wound on the hub 60a.

Next, a tape-cut detecting mechanism 274 at the fifth station 5st will be described with reference to FIG. 30 to FIG. 32.

The tape-cut detecting mechanism 274 is arranged directly under the rotary hub chuck 73 at the fifth station 5st, and includes an electric motor 276 with a frequency generator 275 (hereinafter called "FG motor"), a rotary plate 278 rotatably coupled to the upper end of a motor shaft 277 of the FG motor 276 and a frictional disc 279, for example, of rubber, attached to the upper surface of the rotary place 278. A key groove 281 is formed in the upper end portion of the motor shaft 277. A key 280 fixed to the rotary plate 278 is fitted in the key groove 281. The rotary plate 278 is slidable along the motor shaft 277, and urged upward by a compression spring 283 arranged within a cylindrical spring receiver 282. A flange 284 is fixed to the top end of the motor shaft 277 in order to prevent separation of the motor shaft 277 from plate 278. The FG motor 276 has a constant torque, and it is so designed as to be moved up and down between a lower position shown by the dotdash line on FIG. 30 and an upper position shown by the solid line on FIG. 30 by an air cylinder (not shown). A discrimination circuit for the output of the frequency generator 275 (hereafter called "FG") is shown in FIG. 32.

Next, operation of the above described tape-cut detecting mechanism 274 will be described.

The terminal end of the tape 55a wound on the hub 60a at the fifth station is clamped to the respective hub 60b by the previously described tape clamping operations. The tape path of the tape 55 surrounds the three tape guides 75a, 75b and 75c as shown by the dot-dash line on FIG. 31. The hub 60b is held by the stationary hub chuck 74, and so it is not rotatable.

Figure 30:
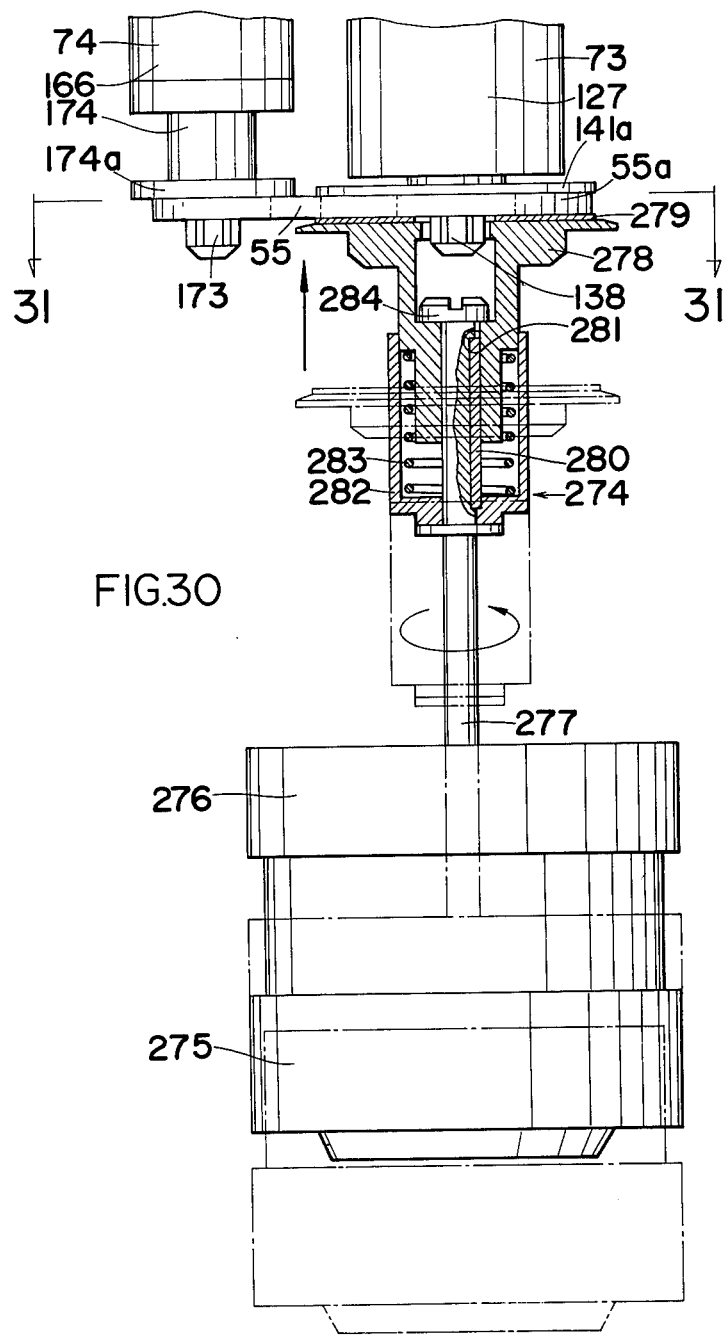
FIG. 30 is an enlarged cross-sectional view of a tape-cut detection mechanism, as viewed along the line 30—30 of FIG. 2.

In the above described condition, the FG motor 276 is moved upward to the upper position shown by the solid line on FIG. 30 so that spring 283 presses the frictional disc 279 attached to the upper surface of the rotary plate 278 against the lower surface of the tape 55a wound on the hub 60a .

The FG motor 276 is rotated with a constant torque. The rotational force of the motor 276 is transmitted to the rotary plate 278 through the motor shaft 277, the key 280 and the key groove 281. The rotary plate 278 is rotated in the direction shown by the arrow on FIG. 31. The rotational torque of the rotary plate 278 is frictionally transmitted to the tape 55a wound on the hub 60a through the frictional disc 279. The tape 55a wound on the hub 60a is rotated with a constant torque in the direction shown by the arrow on FIG. 31, to take up the slack in tape 55 between hubs 60a and 60b.

Figure 31:
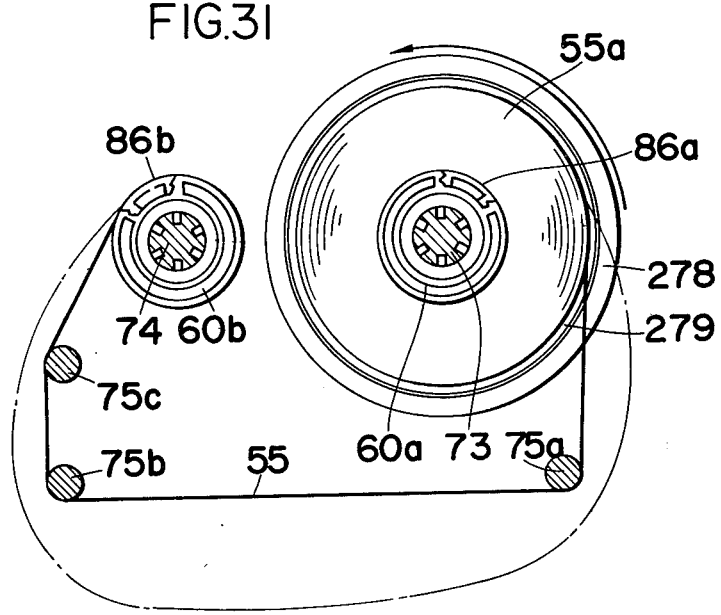
FIG. 31 is a cross-sectional view taken along the line 31—31 of FIG. 30.

When the tape 55 is not cut, ad the ends of the tape 55 are surely clamped to the hubs 60a and 60b, the slack in the tape 55 shown by the dot-dash line in FIG. 31 is removed, and so the tape 55 is tensioned as shown by the solid line on FIG. 31. At the instant that the tape is tensioned, the FG motor 276 is braked through the frictional disc 279 by the wound tape 55a, and the motor stops.

If the tape is cut, or when both ends of the tape 55 are not clamped to the hubs 60a and 60b, the tape is not tensioned, and so the wound tape 55a continues to rotate. The FG motor 276 is not stopped.

Accordingly, whether the tape wound on the hub is defective or not, determines whether the FG motor 276 stops or not.

Next, operation of the discrimination circuit will be described with reference to FIG. 32.

Figure 32:
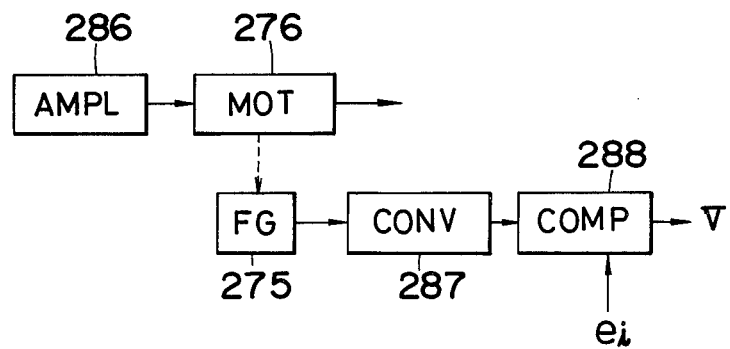
FIG. 32 is a block diagram of a discrimination circuit for the tape-cut detection mechanism.
Figure 33:
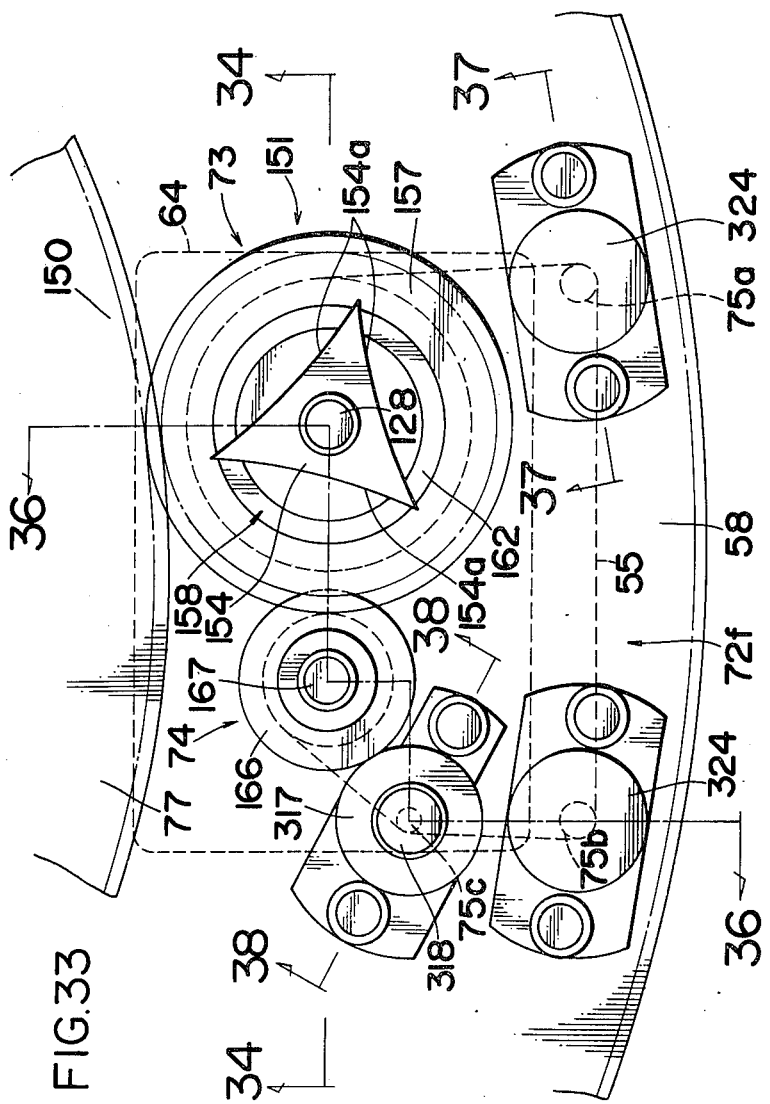
FIG. 33 is an enlarged plan view of an assembling mechanism for a tape wound on a hub in the apparatus of FIG. 1.

In the discrimination circuit of FIG. 32, the FG motor 276 is driven at the constant torque by the output of a constant-current amplifier 286. A frequency signal from the FG 275 provided in the FG motor 276 is converted to a voltage by a frequency-voltage converter 287. The output of the converter 287 is compared with a reference voltage ei in a comparator 288. A discrimination voltage V is obtained to indicate whether the wound tape 55a is defective or not. The quality of the wound tape 55a can be discriminated without damage to the tape.

Next, details of a mechanism 291 for assembling the wound tape 55a and hubs 60a, 60b, into a cassette half at the sixth station 6st will be described with reference to FIG. 33 to FIG. 38.

Figure 34:
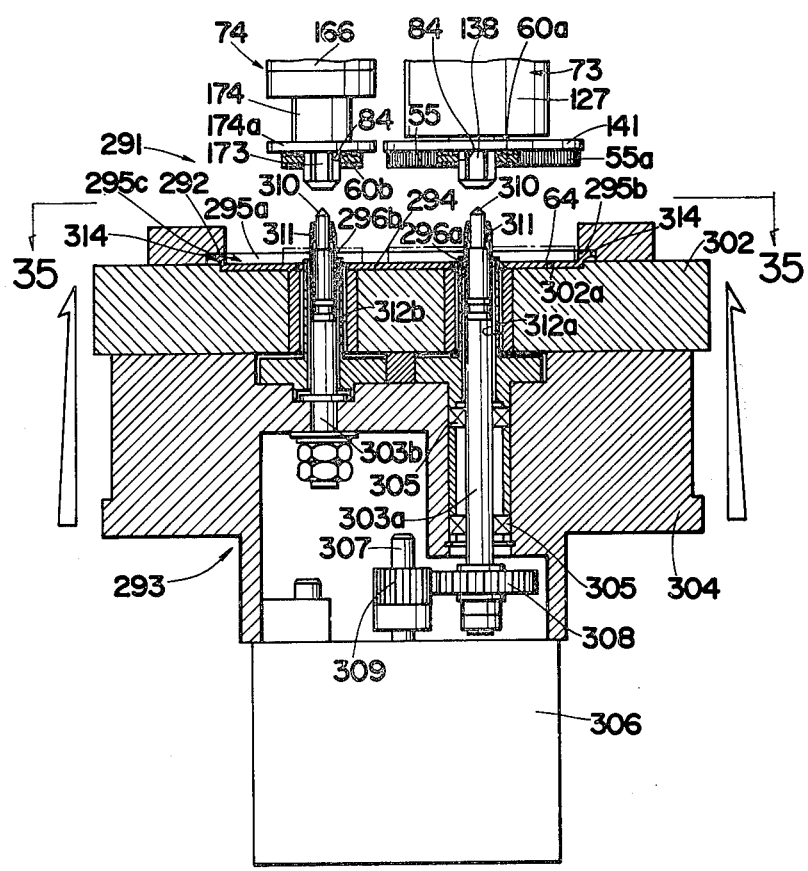
FIG. 34 is a cross-sectional view taken along the line 34—34 of FIG. 33.

In mechanism 291, a cassette half 292 supplied directly under the sixth station 6st by a cassette half supply mechanism (not shown) is lifted by a lift unit 293 (FIG. 34). The wound tape 55a and associated hubs 60a, 60b are assembled into the lifted cassette half 292. The lift unit 293 is moved downward. The cassette half 292 into which the wound tape 55a is assembled, is transported to the next step. The cassette half 292 is a bottom half of a cassette. A top half is combined with the assembled cassette half 292 at the next step to manufacture a complete tape cassette (compact cassette).

The cassette half 292 includes a bottom wall 294, a rear wall 295a and both side walls 295b and 295c. The front wall of the conventional tape cassette, is omitted from the cassette half 292, and is formed as part of a top half to be mated with the cassette half 292. A pair of holes 296a and 296b for inserting reel shafts are formed in the bottom wall 294 of the cassette half 292. A pair of tape guides 297a and 297b are formed on the bottom wall 294 near the front corners. A pair of guide rollers 298a and 298b, a tape pad 299 and partitioning walls 300 are formed on the bottom wall 294 near the front edge of the latter.

The lift unit 293 includes a mount 302 for mounting the cassette half 292, and a lifter 304 having a pair of vertical reel shafts 303a and 303b. The mount 302 and the lifter 304 are moved up and down in correlation with each other by an air cylinder (not shown). The reel shaft 303a is rotatably supported by a pair of bearings 305 on the lifter 304, and is coupled with a motor shaft 307 of a constant tarque motor 306 through a gear 308 connected to the lower end of shaft 303a and another gear 309 fixed to the motor shaft 307. The other reel shaft 303b is fixed to the lifter 304. Conical portions 310 are formed on the upper ends of the reel shafts 303a and 303b, so as to be fitted into the recesses 147 formed on the lower ends of the hub holding shafts 128 and 167 of the hub chucks 73 and 74. Slitted cylinders 311 are fixed to the upper end portions of the reel shafts 303a and 303b, so as to be frictionally engageable in the holes 84 of the hubs 60a and 60b. The shafts 303a and 303b pass through holes 312a and 312b made in the mount 302, and project from the upper surface of the mount 302.

Next, there will be described the operation by which the lift unit 293 is loaded with the cassette half 292.

First, the lifter 304 is separated downwardly from the mount 302. The reel shafts 303a and 303b are drawn out from the mount 302. In that condition, the cassette half 292 is horizontally supplied from the left hand side, as viewed on FIG. 36, to the upper surface 302a of the mount 302, and stopped by a pair of half stoppers 313. Thus, the cassette half 292 is positioned. The side walls 295b and 295c of the cassette half 292 are engaged with a pair of grooves 314 made in the mount 302. Thus, the cassette half 292 is closely fitted to the upper surface 302a of the mount 302. Then, the lifter 304 is moved upward relative to the mount 302. The reel shafts 303a and 303b are inserted through the holes 312a and 312b of the mount 302, and project from the upper surface of the mount 302. As shown in FIG. 34, the reel shafts 303a and 303b pass through the holes 296a and 296b of the cassette half 292. Then, the mount 302 and the lifter 304 are moved upward together from the position shown in FIG. 34 to assemble the tape wound on the hubs into the cassette half 292, as described hereafter.

Two of the three tape guides 75a, 75b and 75c mounted on the rotary table 58, specifically, the tape guides 75a and 75b, have the same construction, as shown in FIG. 37, while construction of the tape guide 75c is shown in FIG. 38.

As shown in FIG. 38, the tape guide 75c is formed integrally with a shaft 318 which is slidable in a cylindrical holder 317 fixed to the rotary table 58. The slidable shaft 318 is urged downward by a compression spring 319. A stopper ring 320 for determining the lower position of the slidable shaft 318 is fixed in the lower end of the holder 317. As shown in FIG. 37, the tape guide 75a or 75b is formed integrally with a shaft 323 which is slidable in a cylindrical holder 322 fixed to the rotary table 58. Another slidable shaft 324 is inserted through the upper portion of the cylindrical holder 322. Racks 325 and 326 are formed integrally with the upper end of the lower slidable shaft 323 and with the lower end of the upper slidable shaft 324, respectively. A pinion 327 rotatably supported within the cylindrical holder 322 is engaged with the racks 325 and 326. The upper slidable shaft 324 is urged upward by a compression spring 328. The lower position of the lower slidable shaft 323 is determined by an annular projection 329 formed on the lower end portion of the cylindrical holder 322.

Next, operation of the above described mechanism 291 for assembling the wound tape and hubs into the cassette half 292 will be described.

While the tape 55a wound on the hub 60a is transported through the fifth station 5st to the sixth station 6st from the fourth station 4st, the tape winding gear 157 engaged with the stationary gear 77 is rotated to drive the hub holding shaft 128 through the frictional clutch 158. The wound tape 55a is tightened and sagging of wound tape 55a during the transport is avoided.

As shown by the solid line in FIG. 31, the tape 55 is tensioned between the tape guides 75a, 75b and 75c, and transported to the sixth station 6st. An excess rotational force is not transmitted to the wound tape 55, since the clutch shoes 162 and 163 slip relative to each other in the frictional clutch 158.

When the wound tape 55a and the associated hubs 60a, 60b stop at the sixth station, the lift unit 293 is moved upward to the upper position shown by the solid line in FIG. 36 from the lower position shown in FIG. 34. The bottom wall 294 of the cassette half 292 comes into contact with the lower surfaces of the hubs 60a and 60b.

The conical top ends 310 of the reel shafts 303a and 303b are fitted into the recesses 147 of the lower ends of the hub holding shafts 128 and 167 of the hub chucks 73 and 74 to push upward the hub holding shafts 128 and 167 against the compression springs 132 and 170 as shown in FIG. 36. The hubs 60a and 60b are released from the hub holding fingers 140 and 170. The reel shafts 303a and 303b, are inserted through the holes 84 of the hubs 60a and 60b, while the hub holding shafts 128 and 167 are drawn out from the holes 84 of the hubs 60a and 60b. The detents 83 of the hubs 60a and 60b are pressed to against the slitted cylinders 311 fixed to the upper end portions of the reel shafts 303a and 303b. Thus, the hubs 60a and 60b are transfered to the cassette half 292 from the hub holding shafts 128 and 167, and so the tape 55a wound on the hub 60a is assembled into the cassette half 292. The two tape guides 75a and 75b are pushed upward to the positions shown by the solid line on FIG. 36 from the original positions shown by the dot-dash line on FIG. 36 against the compression spring 328, by the upper surface 302a of the mount 302. Similarly, the other tape guide 75c is pushed upward from the original position shown by the dotted line on FIG. 36 against the compression spring 319 by the bottom wall 294 of the cassette half 292.

Figure 35:
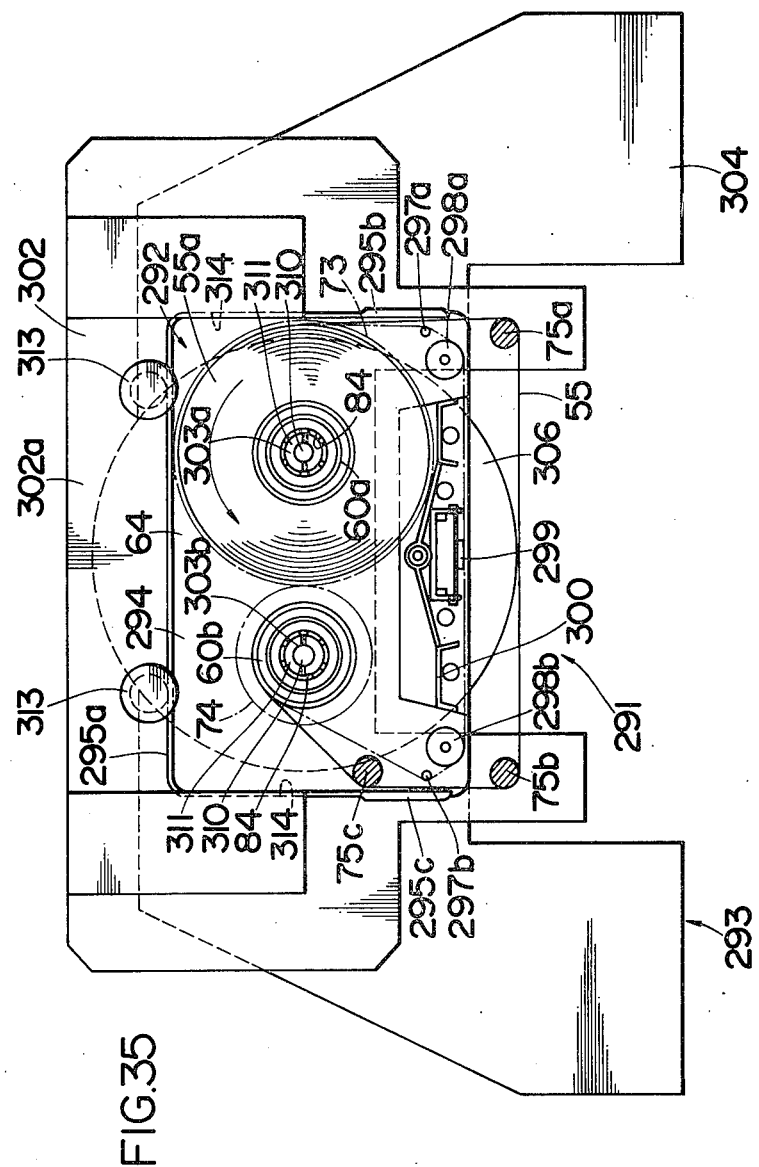
FIG. 35 is a plan view, as viewed along the line 35—35 of FIG. 34.

The tape path formed by the tape guides 75a, 75b and 75c is exactly positioned between the side walls 295b and 295c of the cassette half 292 and the tape guides 297a and 297b thereof, as shown by the solid line in FIG. 35.

The slidable shafts 324 of the tape guides 75a and 75b are pushed downward, as shown by the arrow on FIG. 37 against the compression springs 328 by a pushing member (not shown). The lower slidable shaft 323 is moved upward through the rack 325 engaged with the pinion 327 which is, in turn, engaged with the rack 326 fixed to the upper slidable shaft 324. The tape guides 75a and 75b are further moved upward from the tape path, as shown by the arrow on FIG. 36.

The constant torque motor 306 is driven to rotate the reel shaft 303a through the motor shaft 307 and the gears 309 and 308 with the constant torque. The hub 60a is rotated with the reel shaft 303a in the direction shown by the arrow on FIG. 35. The slackened tape 55 is tensioned. The tape 55 is extended between the guide rollers 298a and 298b. Since there is no hindrance in front of the cassette half 292, the tape 55 can be smoothly and surely withdrawn into the cassette half 292.

The thus assembled cassette half 292 is moved down to the lower position with the lift unit 293. The remaining tape guide 75c is drawn out from the tape path with the downward movement of the assembled cassette half 292. The assembled cassette half 292 is taken out from the mount 302, and then transported to have further manufacturing operations performed thereon.

Figure 40:
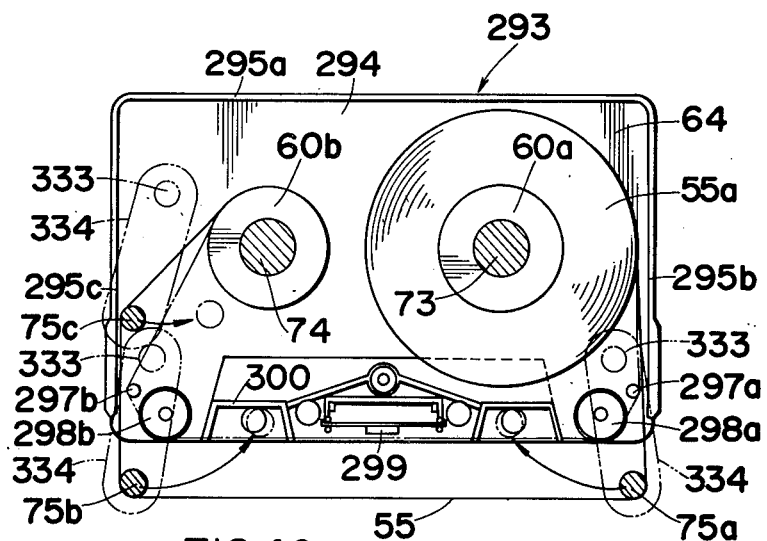
FIG. 40 is a cross-sectional view taken along the line 40—40 of FIG. 39.
Figure 41:
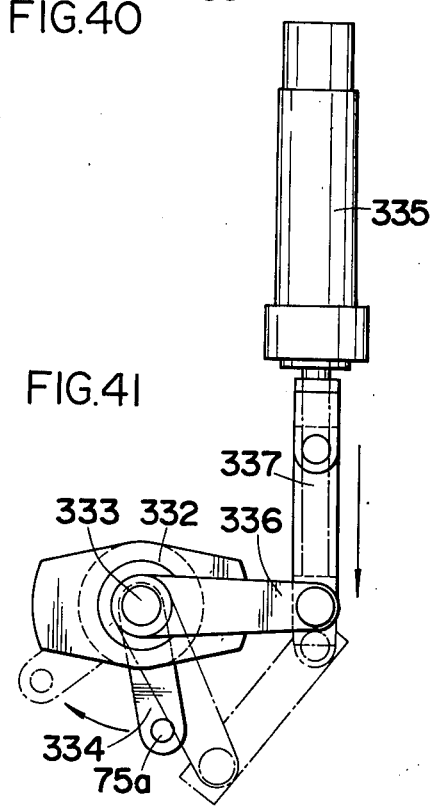
FIG. 41 is a view taken along the line 41—41 of FIG. 39.

FIG. 39 to FIG. 41 show a modification of the above described tape guides 75a, 75b and 75c. In that modification, a rotary shaft 333 is rotatably supported in a cylindrical holder 332 fixed to the rotary table 58. A rotary arm 334 is fixed to the lower end of the rotary shaft 333. The tape guide 75a, 75b, or 75c is fixed to one end of the rotary arm 334. Another rotary arm 336 is fixed to the upper end of the rotary shaft 333. One end of the rotary arm 336 is connected to a connecting rod 337 of an air cylinder 335 mounted on the rotary table 58. The lower rotary arm 334 is rotated as shown by the arrow on FIG. 41 through the rotary shaft 333, the upper rotary arm 336 and the connecting rod 337 by the air cylinder 335.

After the wound tape 55a and hubs 60a 60b are assembled into the cassette half 292, the rotary shaft 333 is rotated to displace the tape guide 75a, 75b or 75c. Thus, the tape 55 is slackened.

Finally, an automatic tape reel exchange mechanism 340 at the turntable 50 will be described with reference to FIG. 42A to FIG. 45.

The automatic tape reel exchange mechanism 340 includes a reel supply mechanism 341, a reel position detection mechanism 342, a reel stop mechanism 343, a tape cutting mechanism 344, and a tape holding/splicing mechanism 345.

As shown in FIG. 45, the terminal end 347a of the tape 55 is attached by double-sided adhesive tape 349 to the outermost of the turns 348 of tape wound on each of the tape reels 53a and 53b. Accordingly, the tape will not be unexpectedly drawn out or unwound during transportation and handling of the tape reels 53a and 53b. A metallic foil 350 such as aluminium foil is attached to the terminal end 347a adjacent to the adhesive tape 349, for detection of the reel position.

The reel supply mechanism 341 works to automatically exchange a used tape reel with a new tape reel at the reel exchange station Bst, and consists of a used tape reel removing robot 351a and a new tape reel supply robot 351b, as shown on FIG. 42c.

The reel position detection mechanism 342 works to detect the position of the supplied tape reel at the reel exchange station Bst. It comprises a photo-sensor 353 such as a reflection-type photoelectric tube.

The reel stop mechanism 343 works to position the tape reel detected with the reel position detection mechanism 342 on the turntable 50. It comprises a pair of plunger-solenoids 355a and 355b (hereafter simply called "plunger"). The plungers 355a and 355b are arranged perpendicularly to the axes of the tape reels 53a and 53b. Rubber pads 356a and 356b are attached to the ends of the plungers 355a and 355b. The pads 356a and 356b are adapted to be pressed against the circumferential surfaces of the tape reels for stopping the tape reels.

The tape cutting mechanism 344 works to cut the tape upon exhaustion of the tape supply on the tape reel at the tape supply station Ast. It comprises a tape cutter 358 and a pair of tape pushing rollers 359a and 359b mounted on the turntable 50. As shown in FIG. 44, each tape pushing roller 359a or 359b is connected to a support arm 360 slidably mounted in a holder 361, and urged outwardly by a compression spring 362 arranged in the holder 361.

Figure 43:
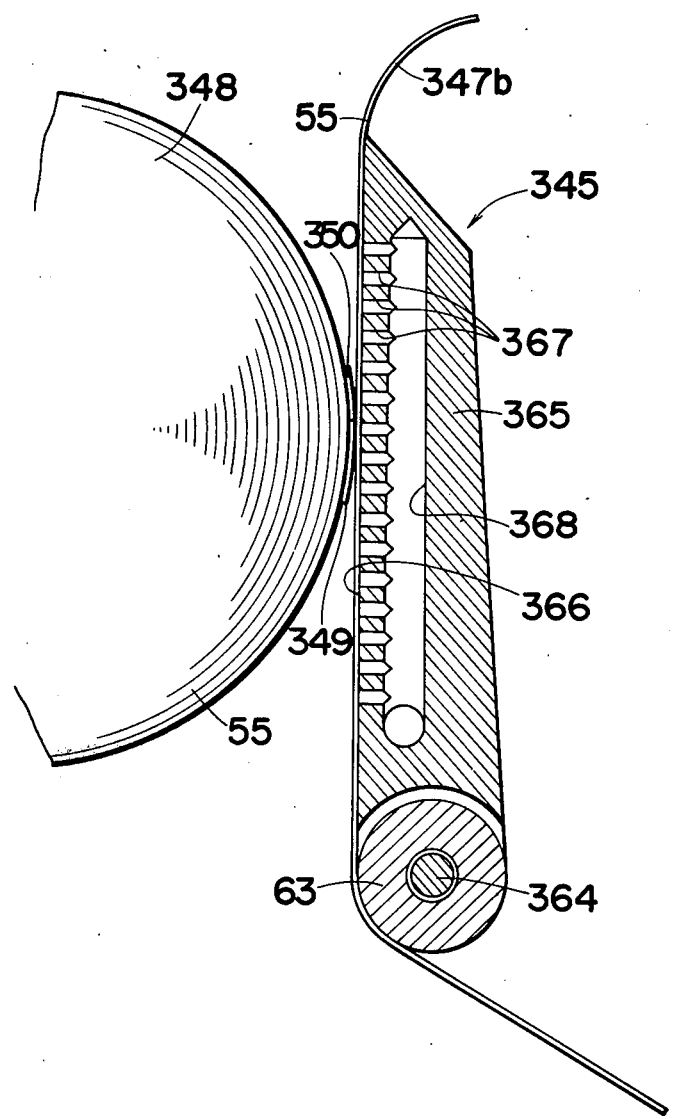
FIG. 43 is an enlarged cross-sectional view of a splicing arm in the mechanism of FIG. 42A to FIG.42D.

The tape holding/splicing mechanism 345 works to hold the tape end cut with the tape cutting mechanism 344 and to splice the tape end with a tape end of a new tape supply reel. As shown in FIG. 43, it includes a splice arm 365 rotatably supported by a support pin 364. Numerous air suction pores 367 are made in a tape holding surface 366 of the splice arm 365. The pores 367 communicate with an air suction chamber 368 in the splice arm 365. The air suction chamber 368 is connected to a suitable air suction mechanism. One of the guide rollers 63 is supported on the support pin 364. The splice arm 365 is so designed as to be rotated by an air cylinder (not shown).

A tape clamping mechanism 370 is arranged along the tape supply path near the supply station Ast. It includes a plunger-solenoid (hereafter simply called "plunger") 371, a pad 372 fixed to the end of the plunger 371 and a pad receiver or back-up 373. As above described, the turntable 50 is intermittently rotated by 180° through the rotary shaft 51 by a motor 375.

Next, operation of the above described automatic tape reel exchange mechanism 340 will be described.

While the tape 55 is supplied from the tape reel 53a at the supply station Ast, the new tape reel 53b is supplied to the exchange station Bst, and held by the reel supporting shaft 52a.

Figure 42A:
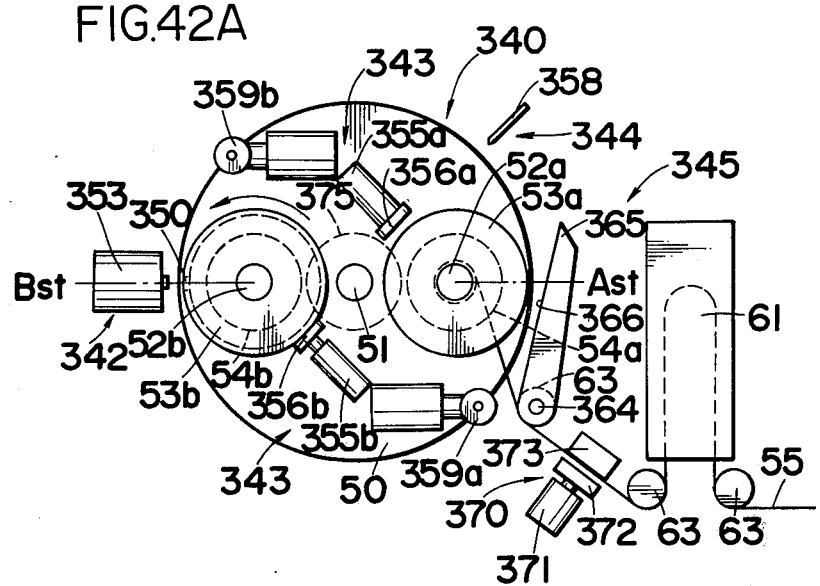

The servomotor 54b is driven at a low speed to rotate the new tape reel 53b in the direction shown by the arrow on FIG. 42A. At the instant that the metallic foil 350 on the circumferential surface of the new tape reel 53b is sensed by the photo-sensor 353, the servomotor 54b is stopped, and concurrently the pad 356b of the plunger 355b is pressed against the circumferential surface of the new tape reel 53b. Thus, the new tape reel 53b is fixedly positioned on the turntable 50, while the tape 55 is intermittently supplied from the old tape reel 53a.

Figure 42B:
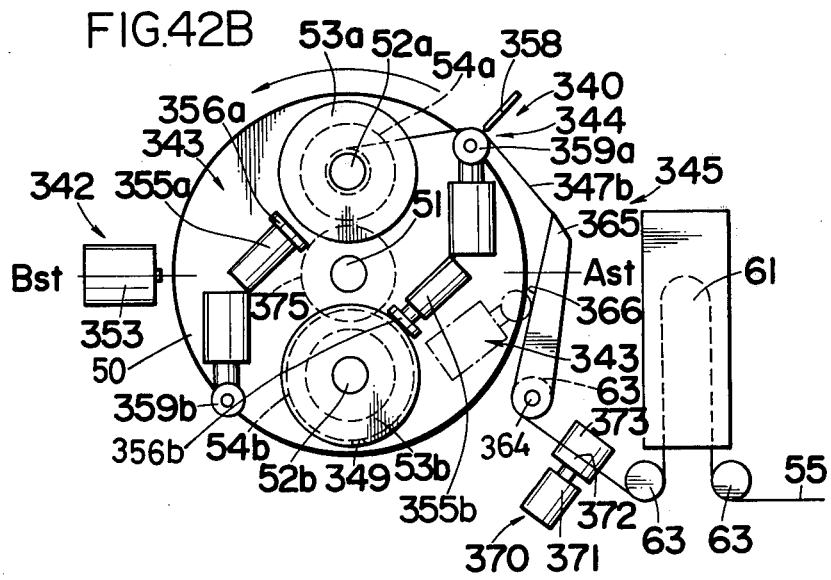

When the whole of the several tens of tape pieces of the edited tape has been supplied from the old tape reel 53a, the tape 55 is clamped between the pad 372 of the plunger 371 and the back-up or pad receiver 373 at the tape supply path near the tape supply station Ast, as shown in FIG. 42B.

Then, the turntable 50 is driven by motor 375 in the direction shown by the arrow on FIG. 42B. The tape end 347b of the old tape reel 53a is pushed to the splicing arm 365 by the tape pushing roller 359a, as shown by the dot-dash line on FIG. 42B. As soon as the tape end 347b of the old tape reel 53a is pushed against the splicing arm 365, the tape end 347b is adhered to the tape holding surface 366 of the splicing arm 365, by the suction action of the pores 367 of the tape holding surface 366. The tape end 347b is held by the splicing arm 365.

After the tape pushing roller 359a passes over the splicing arm 365, the tape end 347b is pressed between the tape pushing roller 359a and the tape cutter 358 by the function of the compression spring 362, as shown by the solid line on FIG. 42B. The tape end 347b is cut away there from the old tape reel 53a.

The turntable 50 is rotated by 180° from the position shown in FIG. 42A, and stops at the position shown in FIG. 42C where it may be held by a positioning mechanism (not shown).

In the position shown on FIG. 42C, the old tape reel 53a is located at the reel exchange station Bst, and the new tape reel 53b is located at the top supply station Ast. Then, the splicing arm 365 is rotated around the support pin 364 to the position shown by the solid line on FIG. 42D. The tape end 347b held by the splicing arm 365 is pressed against the double-sided adhesive tape 349 attached to the tape end 347a of the new tape reel 53b. The tape ends 347a and 347b are spliced to each other. Thus, a series of the tape splicing steps is completed.

The plungers 355b and 371 are deenergized. The pad 356b of the plunger 355b is separated from the new tape reel 53b to release the latter. The pad 372 of the plunger 371 is separated from the pad receiver or back-up 373 to release the clamp of the tape 55. At the same time, the splicing arm 365 is rotated back to the original position shown by the dot-dash line on FIG. 42D. The air suction at the pores 367 is terminated to release the tape end 347b from the splicing arm 365.

The useless tape between the spliced old and new tapes 55 is sucked into the useless tape suction path 242 of the tape holding unit 206, cut by the cutter 243 and scrapped. With the suction of the useless tape into the tape suction path 242, the tape 55 of the new tape reel 53b is automatically threaded through the predetermined tape supply path, and prepared for the next tape winding step.

The old tape reel 53a at the reel exchange station Bst is removed from the reel support shaft 52a on the turntable 50, and a further new tape reel is supplied to the reel support shaft 52a on the turntable 50, by the automatic tape reel exchange mechanism 341. The further new tape reel is positioned on the turntable 50, to await its subsequent exchange with the reel 53b.

By reason of the described automatic tape exchange mechanism 340, the whole apparatus does not need to be temporarily stopped for the exchange of the tape. Accordingly, it imparts high productivity to the apparatus.

While preferred embodiments of the invention have been described, variations thereof will occur to those skilled in the art within the scope of the present inventive concepts which are delineated by the following claims.

We claim:

1. A manufacturing apparatus for a tape cassette comprising:
    a rotary table having at least one pair of hub holding means for demountably holding a pair of hubs supplied to said rotary table and being movable along a predetermined transport path upon rotation of said table;
    means for clamping an initial end of a supplied tape to one of said hubs held by said hub holding means;
    tape winding means for winding a predetermined length of said supplied tape onto said one hub;
    cutting means for cutting a trailing portion of said tape wound on said one hub;
    means for clamping the terminal end of said cut tape to the other of said hubs;
    assembling means for mounting a cassette half, transporting said hubs to which the ends of said tape are clamped and on which said tape is wound, to a position adjacent to a mounted cassette half, demounting said hubs from said hub holding means and assembling said hubs into said mounted cassette half; and means for intermittently rotating said table to position said hub holding means at each of the other above-mentioned means.

2. A manufacturing apparatus according to claim 1, further comprising:
    a turntable to be intermittently rotated by a predetermined angle;

plural reel holding means arranged at predetermined angular intervals on said turntable;

tape supply reels respectively demountably held by said reel holding means;

another cutting means for cutting a trailing portion of a tape supply dranw out from one of said tape reels when substantially the whole of said tape supply wound on said one of tape supply reel has been exhausted;

a holding means for holding the terminal end of said cut tape supply at a predetermined position; and tape connecting means for connecting the initial end of a new tape supply wound on another of said tape supply reels with the terminal end of said cut tape supply.

3. A manufacturing apparatus according to claim 1, further comprising:

hub supply means for supplying said hubs to a predetermined position, said hubs each having a cut-out portion for engaging with a tape end;

hub positioning means for positioning said hubs supplied to said predetermined position with said cut-out portions extending in predetermined directions, whereupon said hub holding means hold said positioned hubs;

tape end applying means for applying a tape end to said cut-out portion of one of said positioned hubs;

clamp piece supply means for supplying a clamp piece to a clamp position adjacent to said one hub held by said hub holding means; and clamping piece drive means for driving said clamp piece to said cut-out portion of said one hub and clamping said tape end to said one hub.

4. A manufacturing apparatus according to claim 1, in which said hub holding means includes a flange portion, and said tape winding means includes another flange portion which, on operation of said tape winding means, is opposed to the first mentioned flange portion so that said tape is guided by said first flange portion and said other flange portion when said tape is wound on said one hub.

5. A manufacturing apparatus according to claim 1, in which said hub holding means is capable of rotating one of said hubs, and said rotary table further includes a hub position regulation mechanism by which said hub holding means are maintained in a constant condition so that said hubs are mounted on and demounted from said holding means in said predetermined directions within a first predetermined portion of said transport path, and a tape winding mechanism by which said tape wound on said hubs is further wound by rotational force frictionally transmitted from said tape winding mechanism within a second predetermined portion of said transport path.

6. A manufacturing apparatus according to claim 3; further comprising first detecting means for detecting the existence of each of said hubs at said predetermined position by being pushed against said hubs, second detecting means for detecting the direction of said cut-out portion of each of said hubs by fitting into the respective cut-out portion when the latter extends in its said predetermined direction, and discriminating means responsive to the relative positioning of said first and second detecting means for indicating the existence of said pair of hubs held by said hub holding means in said predetermined directions.

7. A manufacturing apparatus according to claim 1; further comprising a motor with a frequency generator for driving one of said pair of hubs after said terminal end of the cut tape has been changed to said other hub, and means for holding said other hub against rotation during operation of said motor so as to take-up any slack in the tape between said hubs; and discriminating means responsive to the output of said frequency generator for indicating defective clamping of the tape to said pair of hubs or cutting of the tape between the pair of hubs in the event that said motor continues to drive said one hub beyond the time needed to take-up the slack.

* * * * *